United States Patent
Blake, III et al.

(10) Patent No.: US 9,225,884 B2
(45) Date of Patent: *Dec. 29, 2015

(54) APPARATUS FOR USE IN ASSOCIATION WITH A VEHICLE

(71) Applicant: TRW Automotive U.S. LLC, Livonia, MI (US)

(72) Inventors: Thomas E. Blake, III, Novi, MI (US); Robert J. Newton, Chesterfield, MI (US)

(73) Assignee: TRW Automotive U.S. LLC, Livonia, MI (US)

( * ) Notice: Subject to any disclaimer, the term of this patent is extended or adjusted under 35 U.S.C. 154(b) by 508 days.

This patent is subject to a terminal disclaimer.

(21) Appl. No.: 13/682,793

(22) Filed: Nov. 21, 2012

(65) Prior Publication Data

US 2013/0076905 A1 Mar. 28, 2013

Related U.S. Application Data

(63) Continuation of application No. 12/836,125, filed on Jul. 14, 2010, now Pat. No. 8,339,453.

(51) Int. Cl.
*H04N 5/225* (2006.01)
*B60R 11/00* (2006.01)
*G01D 11/30* (2006.01)
*B60S 1/08* (2006.01)

(52) U.S. Cl.
CPC ............ *H04N 5/2254* (2013.01); *B60R 11/00* (2013.01); *B60S 1/0881* (2013.01); *B60S 1/0888* (2013.01); *G01D 11/30* (2013.01); *B60R 2011/0026* (2013.01); *B60S 1/0844* (2013.01)

(58) Field of Classification Search
CPC ........... B60R 11/00; B60R 2011/0026; H04N 5/2254; B60S 1/0844; B60S 1/0881; B60S 1/0888
USPC ........................................................ 348/148
See application file for complete search history.

(56) References Cited

U.S. PATENT DOCUMENTS

| | | |
|---|---|---|
| 6,313,454 B1 | 11/2001 | Bos et al. |
| 6,995,354 B2 | 2/2006 | Hagen et al. |
| 7,297,932 B2 | 11/2007 | Georgiadis et al. |
| 7,837,173 B2 | 11/2010 | Zinser et al. |
| 7,965,336 B2 | 6/2011 | Bingle et al. |
| 8,339,453 B2 * | 12/2012 | Blake et al. .................. 348/148 |
| 8,405,726 B2 * | 3/2013 | Schofield et al. ............. 348/148 |
| 8,481,916 B2 * | 7/2013 | Heslin et al. .................. 250/239 |
| 8,513,590 B2 * | 8/2013 | Heslin et al. .................. 250/239 |
| 8,531,278 B2 * | 9/2013 | DeWard et al. ............ 340/425.5 |
| 8,531,279 B2 * | 9/2013 | DeLine et al. ............. 340/425.5 |
| 8,534,887 B2 * | 9/2013 | DeLine et al. ................ 362/494 |
| 8,570,374 B2 * | 10/2013 | Betham et al. ................ 348/148 |

(Continued)

FOREIGN PATENT DOCUMENTS

JP 11078737 A * 3/1999 ............. B60R 21/00

*Primary Examiner* — Tung Vo
(74) *Attorney, Agent, or Firm* — Tarolli, Sundheim, Covell & Tummino LLP

(57) ABSTRACT

An apparatus for use in association with a vehicle having a windshield, includes a module and a camera assembly disposed in the module. The camera assembly includes an image sensor and a camera lens. The camera lens has a first end portion disposed adjacent to the image sensor and a second end portion spaced from the image sensor. A polarizer lens is disposed adjacent to the second end portion of the camera lens.

18 Claims, 16 Drawing Sheets

(56) References Cited

U.S. PATENT DOCUMENTS

| | | | |
|---|---|---|---|
| 8,686,840 B2 * | 4/2014 | Drummond et al. | 340/425.5 |
| 8,692,659 B2 * | 4/2014 | Schofield et al. | 340/438 |
| 8,710,969 B2 * | 4/2014 | DeWard et al. | 340/425.5 |
| 2003/0169522 A1 | 9/2003 | Schofield et al. | |
| 2007/0235638 A1 | 10/2007 | Backes et al. | |
| 2008/0117074 A1 | 5/2008 | Wohlfahrt et al. | |
| 2009/0295181 A1 | 12/2009 | Lawlor et al. | |
| 2012/0224065 A1 * | 9/2012 | Schofield et al. | 348/148 |

* cited by examiner

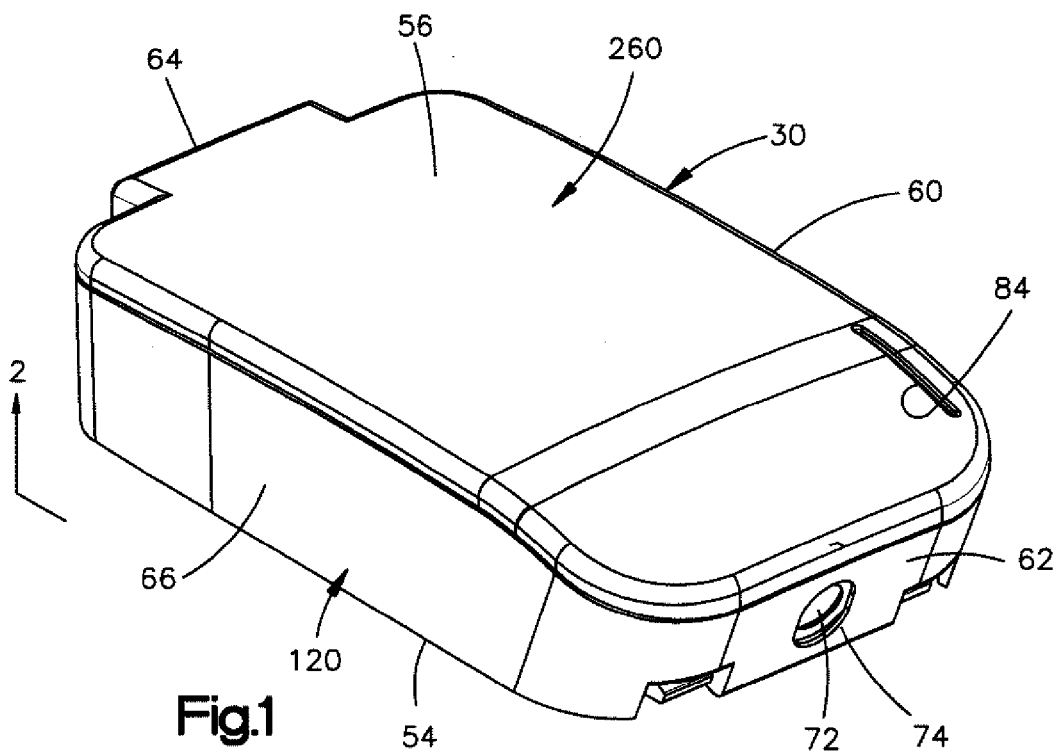
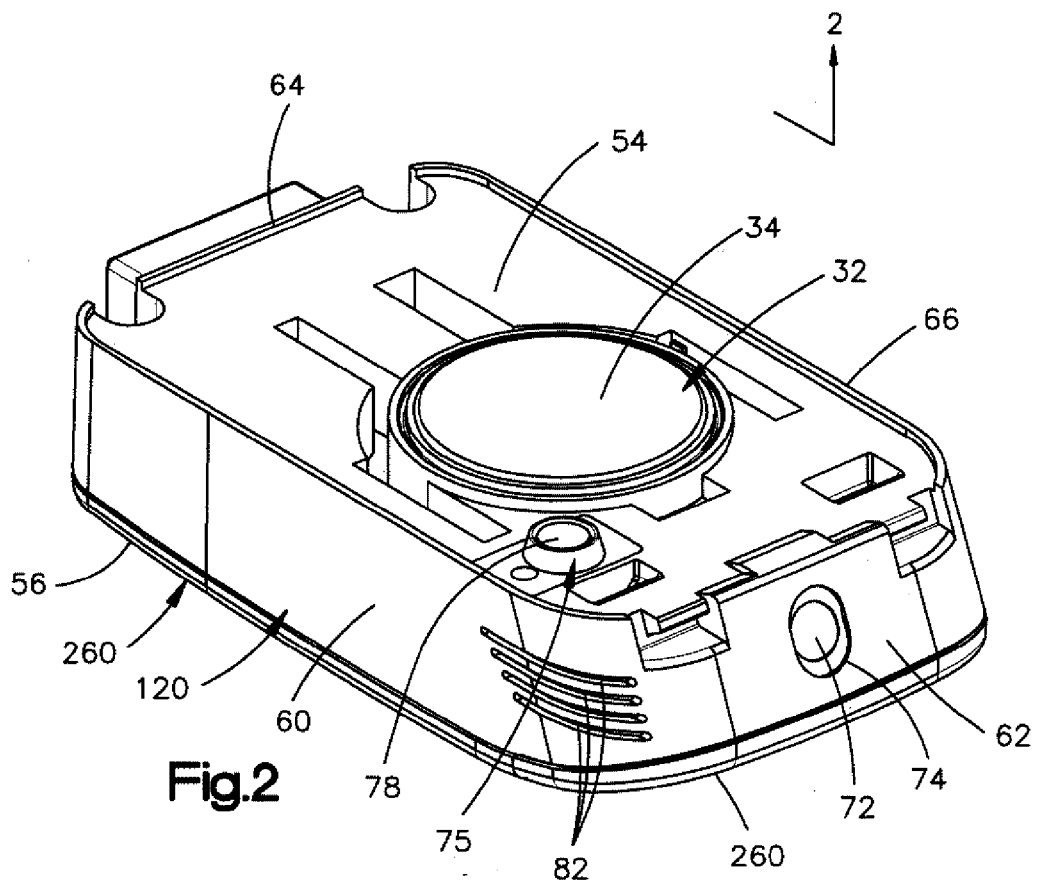

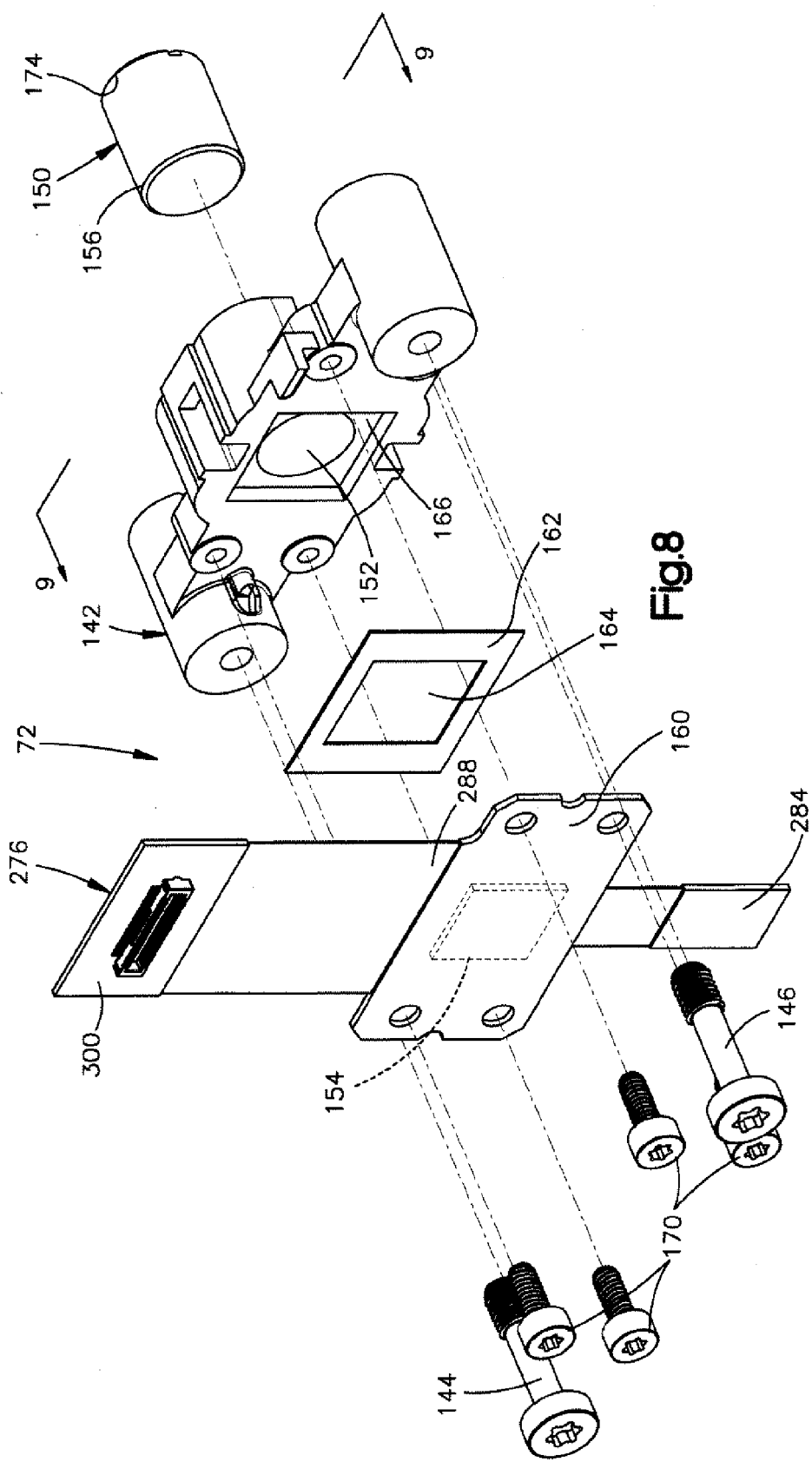

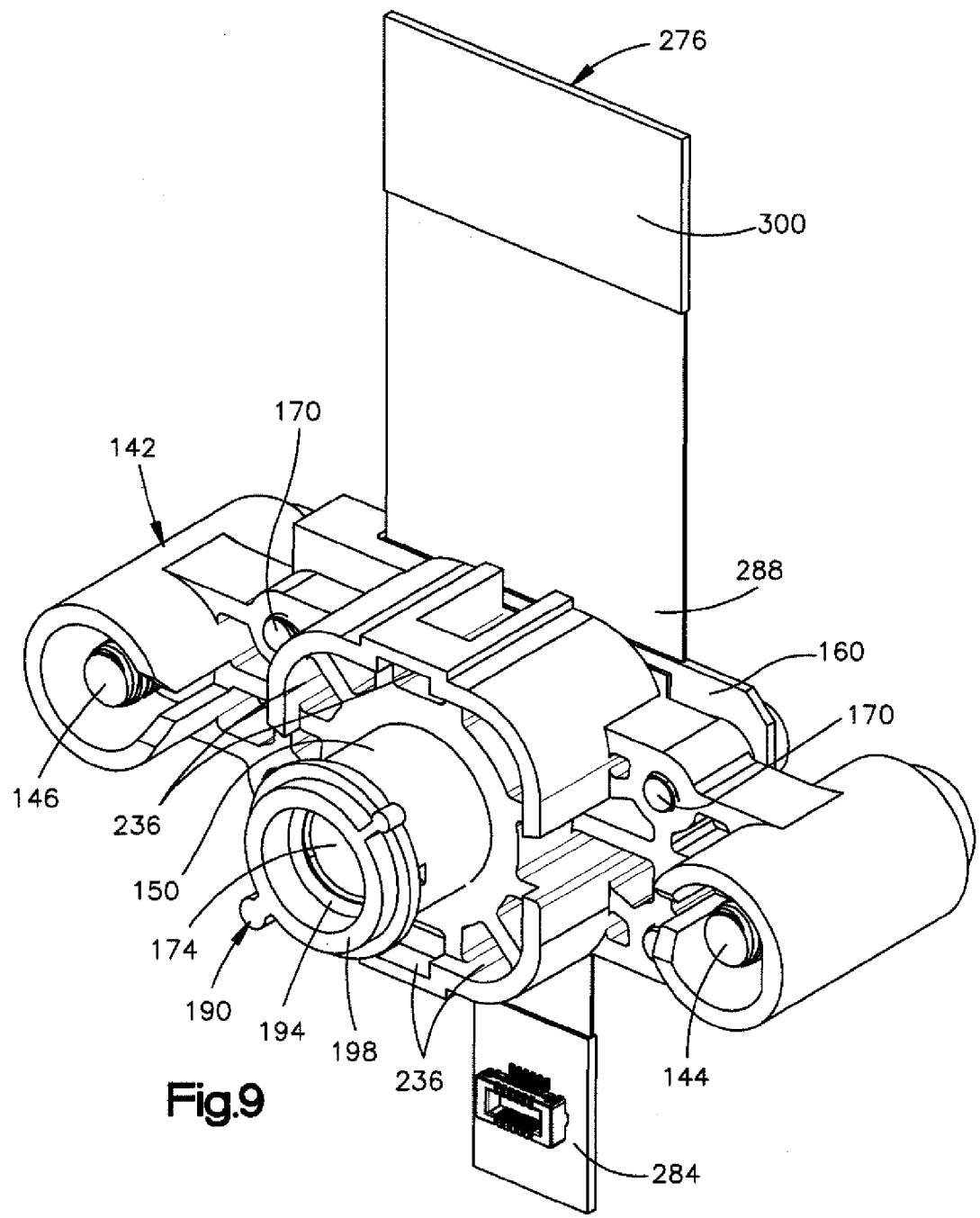

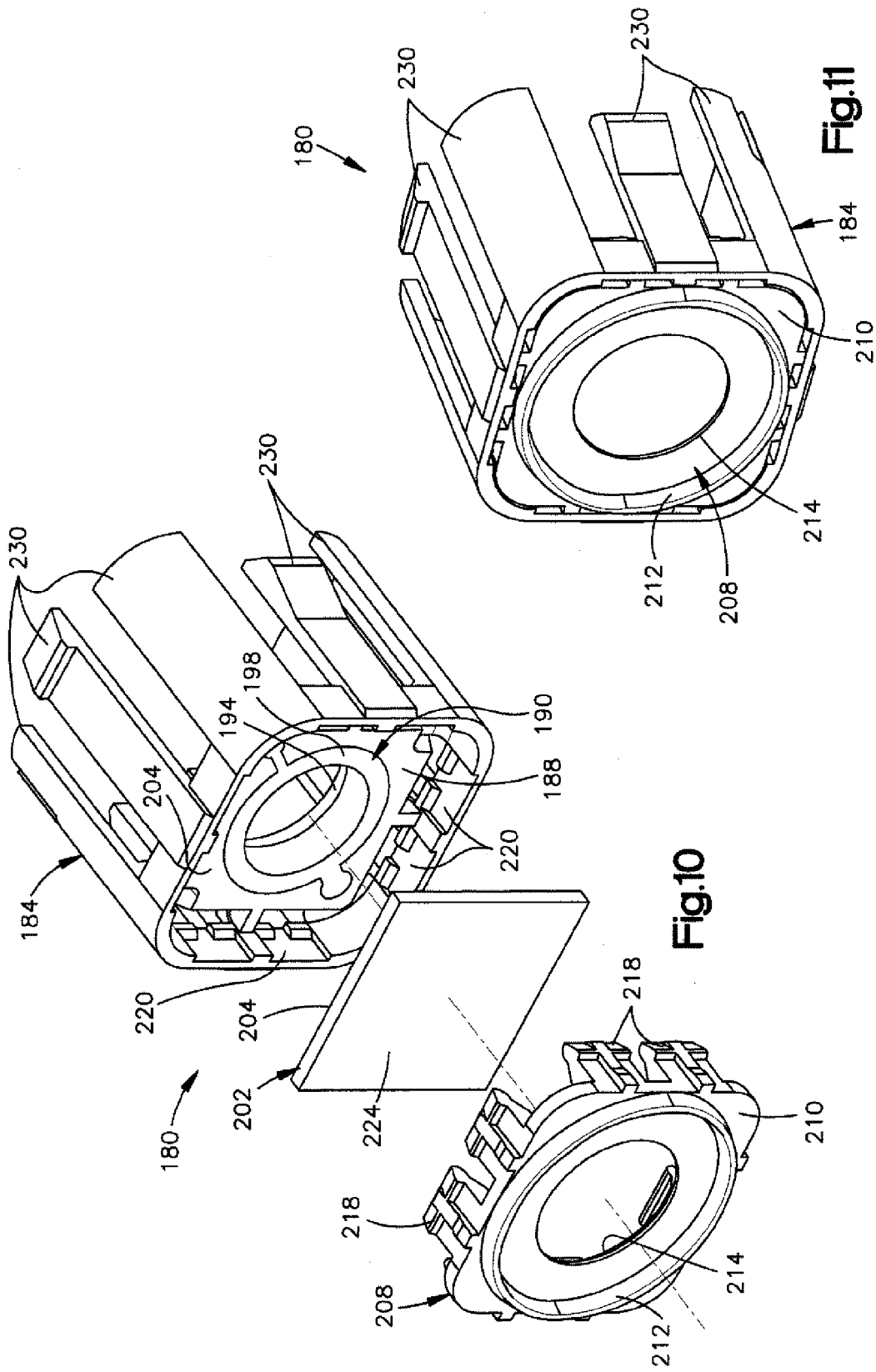

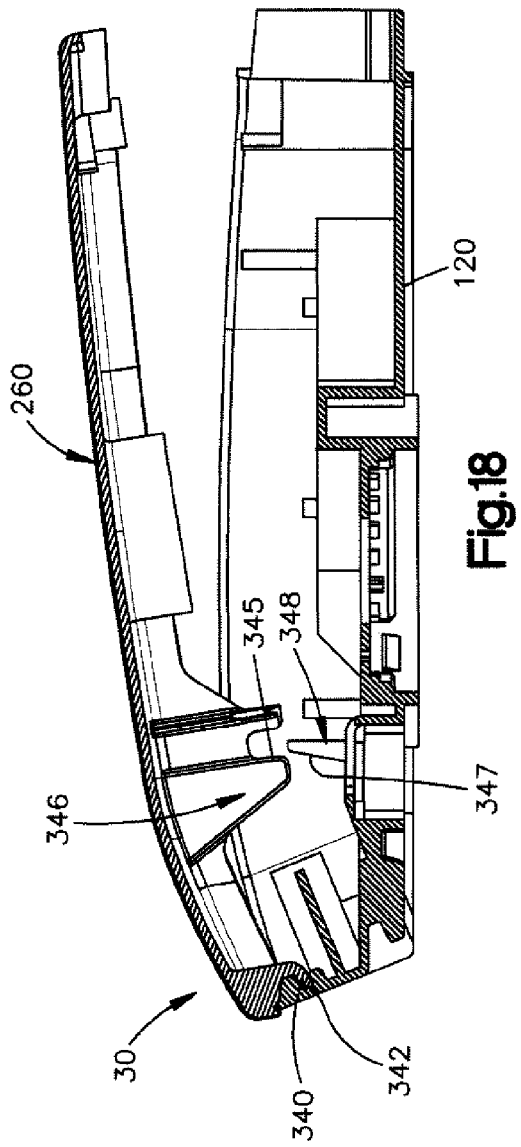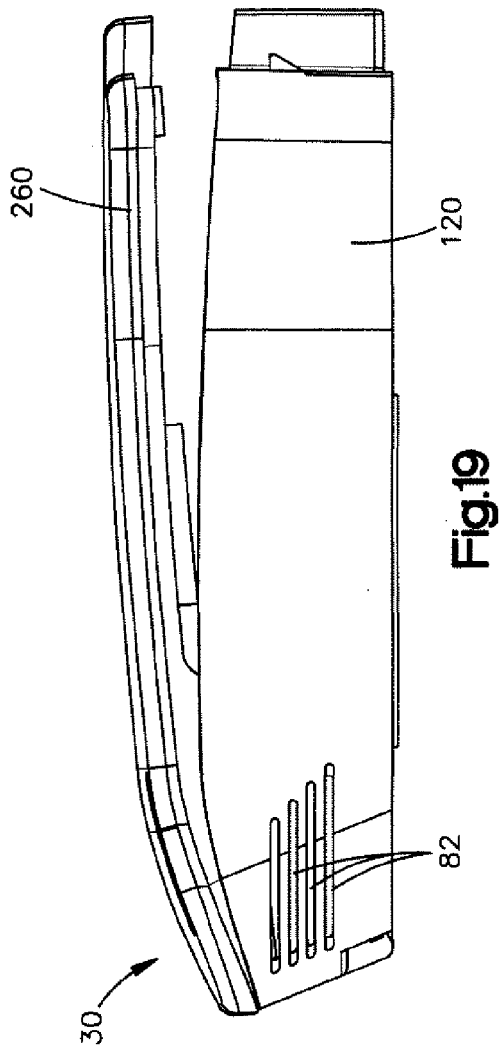

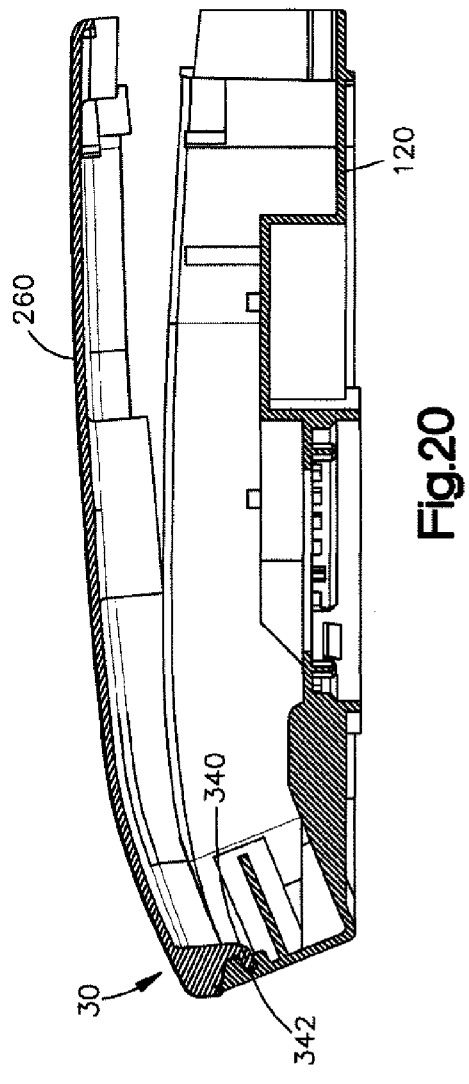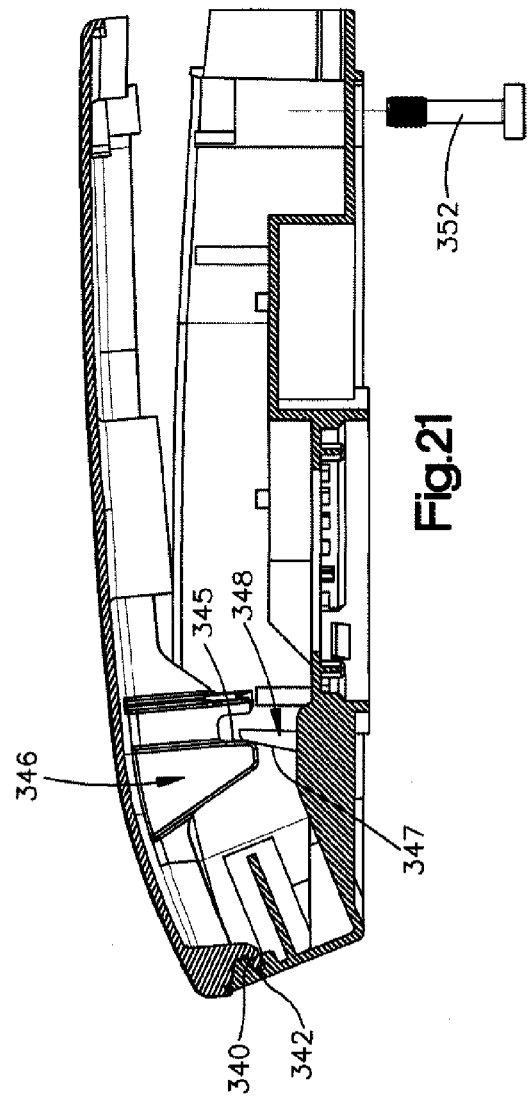

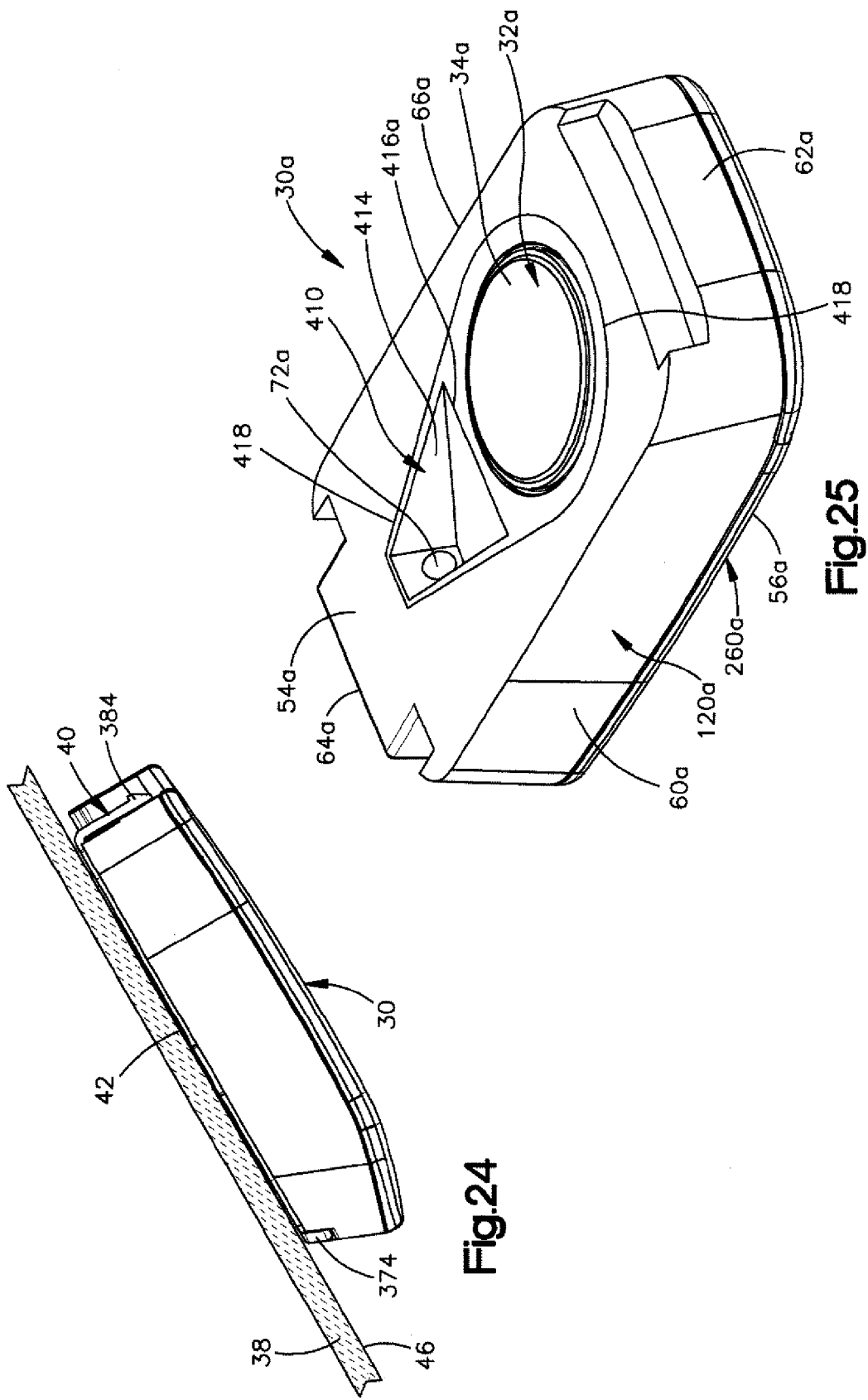

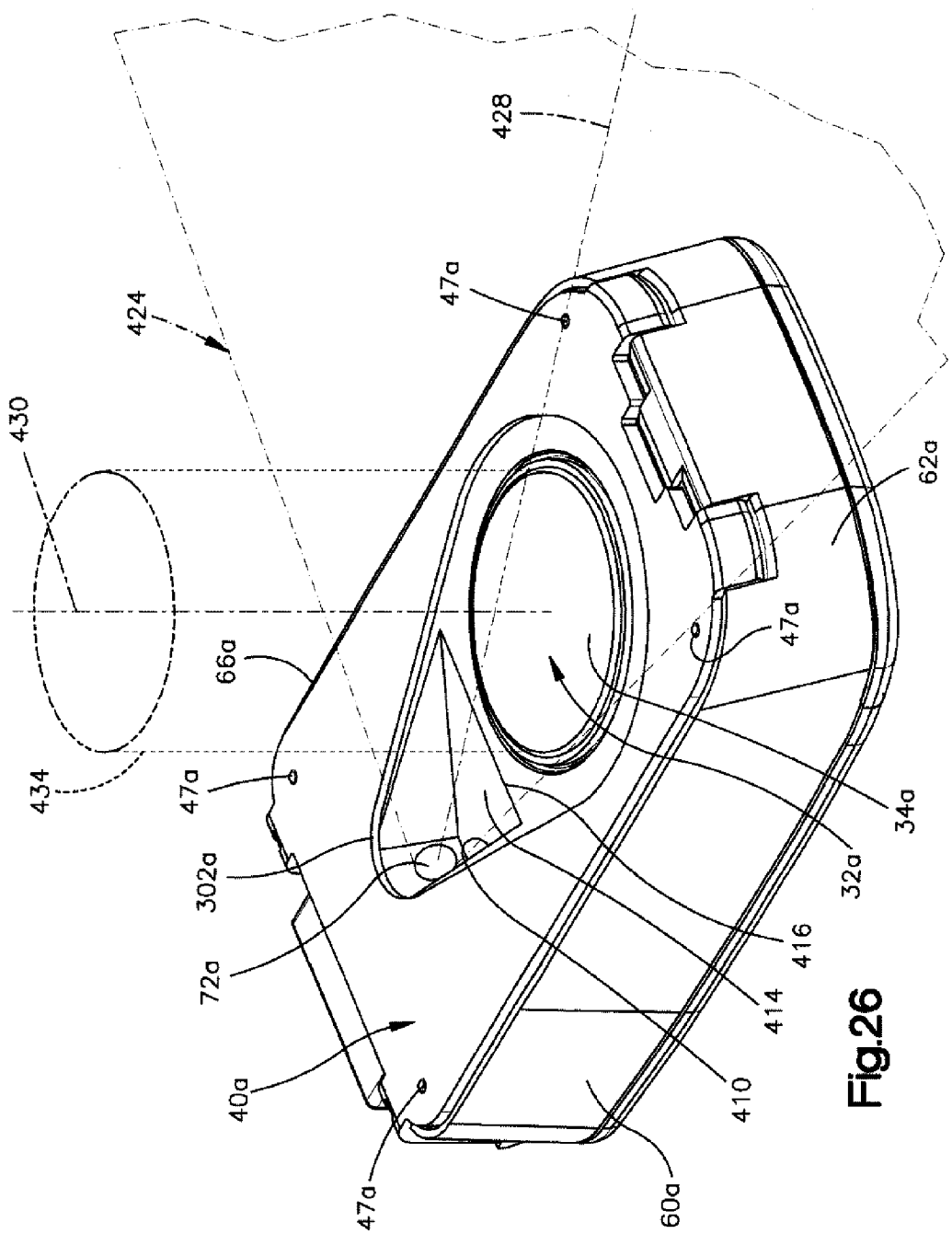

APPARATUS FOR USE IN ASSOCIATION WITH A VEHICLE

RELATED APPLICATION

This application is a continuation of U.S. patent application Ser. No. 12/836,125, filed Jul. 14, 2010, the subject matter of which is incorporated herein by reference.

TECHNICAL FIELD

The present invention relates to an apparatus which is used in association with a vehicle having a windshield. The apparatus includes one or more devices to assist in controlling one or more aspects of operation of the vehicle.

BACKGROUND OF THE INVENTION

It has previously been suggested that various devices may be disposed in a module or unit which is mounted adjacent to an interior surface of a windshield of a vehicle. These devices assist a driver in operating the vehicle. The devices in the module may include a rain sensor, a temperature sensor which senses the temperature of the windshield, and/or a camera assembly which may be used in a collision avoidance system. In addition, it has been suggested that many other devices, such as garage door openers, transmitters, receivers, head lamp controls, radio antennas or internet connections, a compass, and/or a display which indicates the condition of many other devices within a vehicle may be mounted adjacent to an inner surface of a windshield.

The apparatus which is mounted adjacent to the windshield should be compact to minimize interference with sight lines through the windshield. In addition, optimizing the performance of at least some devices which are positioned relative to a windshield requires that the devices be accurately positioned at a desired location relative to the windshield and maintained in that position during operation of the vehicle. Known apparatus which is positioned adjacent to the windshield of a vehicle are disclosed in U.S. Patent Publication Nos. 2007/0235638; 2008/0117074; and 2009/0295181.

SUMMARY OF THE INVENTION

An improved apparatus for use in association with a vehicle having a windshield, that is, a front window, may include a bracket which is adapted to be connected with the windshield or other portion of a vehicle. A module, that is, a unit, which is adapted to be connected with the bracket may contain one or more devices to assist the driver of the vehicle. The module may have an end portion which pivotally engages an end portion of the bracket to position the module for pivotal movement relative to the bracket from a disengaged condition to an engaged condition. When the module is in the engaged condition, the module is urged toward the windshield with a predetermined force.

The module may contain many different devices. For example, the module may contain a camera assembly. The camera assembly may include an image sensor and a camera lens. A polarizer lens may advantageously be provided in association with the camera lens. The module may contain one or more devices other than a camera assembly.

BRIEF DESCRIPTION OF THE DRAWINGS

The foregoing and other features of the present invention will be more apparent upon a consideration of the following description taken in connection with the accompanying drawings wherein:

FIG. 1 is a plan view of a module constructed in accordance with one of the features of the present invention;

FIG. 2 is a plan view, taken generally along the line of FIG. 2-2, of FIG. 1, illustrating coupling devices which project from the module;

FIG. 8 is an exploded schematic illustration of a camera assembly which is to be mounted in the module of FIGS. 1-3;

FIG. 9 is a schematic illustration further illustrating the construction of the camera assembly;

FIG. 10 is a partially exploded schematic illustration depicting the construction of a polarizer lens assembly used with the camera assembly of FIGS. 8 and 9;

FIG. 11 is a schematic illustration further illustrating the construction of the polarizer lens assembly of FIG. 10;

FIG. 18 is a schematic sectional view depicting the relationship between a wedge on the cover portion and a locking feature on the base portion of the module when the cover and base portions are disposed in the spatial relationship illustrated in FIGS. 16 and 17;

FIG. 19 is a schematic illustration depicting the manner in which the cover portion is pivoted toward a closed position from the position illustrated in FIG. 16;

FIG. 20 is a schematic sectional view, generally similar to FIG. 17, illustrating the relationship between the pivot connection and the cover and base portions of the module when they are in the spatial relationship illustrated in FIG. 19;

FIG. 21 is a schematic sectional view, similar to FIG. 18, illustrating a relationship between the wedge on the cover portion and the locking feature on the base portion of the module when the base and cover portions are in the spatial relationship illustrated in FIG. 19;

FIG. 24 is a schematic illustration depicting the manner in which the bracket holds the module in place on the windshield of the vehicle;

FIG. 25 is a plan view, generally similar to FIG. 2, of a second embodiment of the module; and FIG. 26 is a schematic plan view illustrating the relationship of a mounting bracket to the module of FIG. 25.

Figure 3:
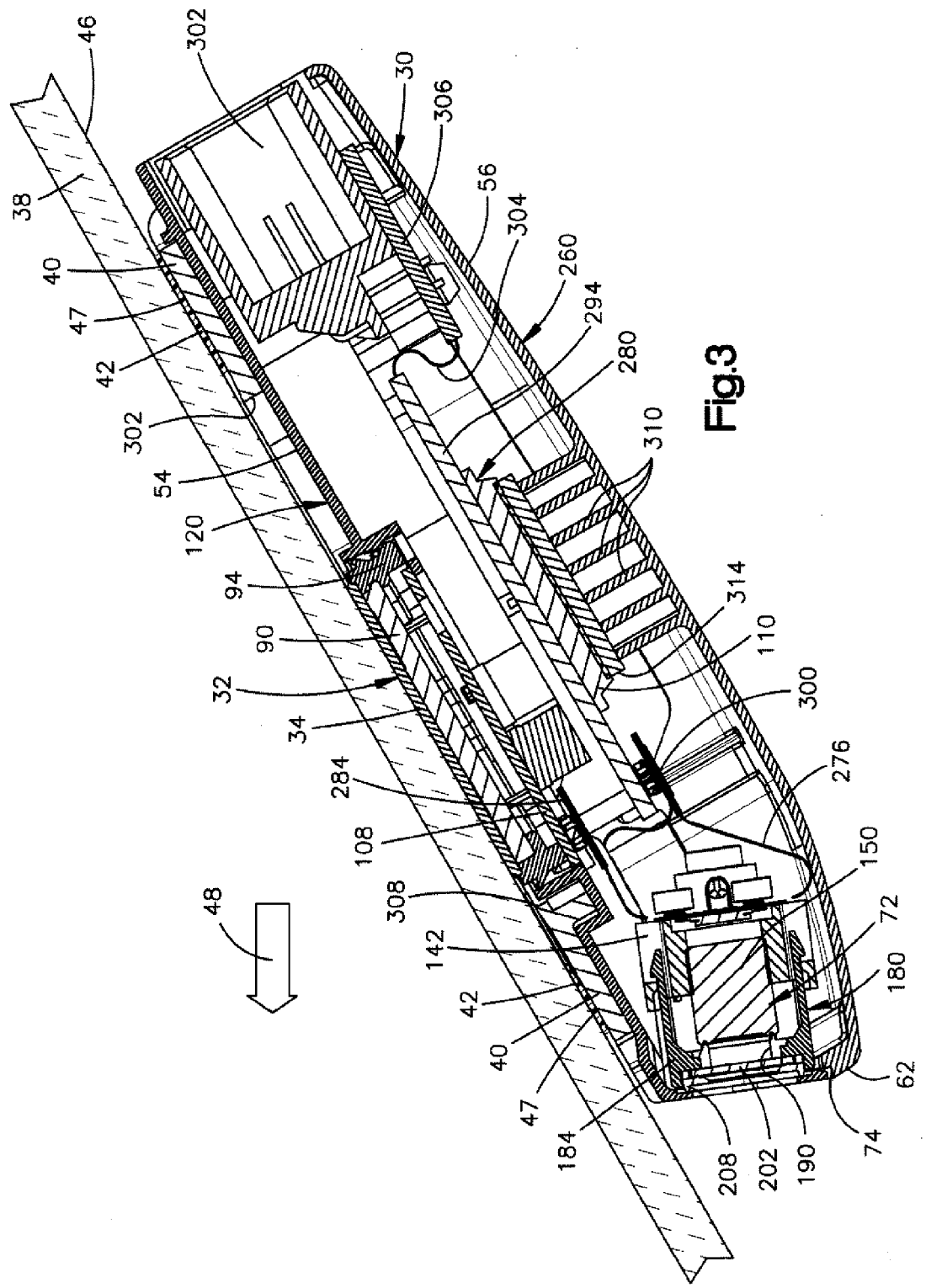
FIG. 3 is a schematic sectional view depicting the manner in which a mounting bracket is utilized to mount the module of FIGS. 1 and 2 on a windshield (front window) of a vehicle with the coupling devices of FIG. 2 engaging the windshield.

DESCRIPTION OF PREFERRED
EMBODIMENTS OF THE INVENTION

General Description

A module 30 (FIGS. 1 and 2) contains one or more devices which facilitate the controlling of one or more aspects of the operation of a vehicle by an operator of the vehicle. The module 30 is a self contained unit that can be connected with known vehicle control systems. The module 30 is a unitary packaged assembly of devices which are used in association with control systems in a vehicle. Other modules, not shown, may be connected with the module 30.

Although the module 30 may contain many different types of devices, the illustrated module 30 contains a plurality of devices which includes a rain sensor 32 (FIG. 2) having a known construction. The rain sensor 32 is provided with a resiliently deflectable coupling device 34 which is utilized to couple the rain sensor to a window of a vehicle. The rain sensor 32 may have a construction similar to that disclosed in U.S. Patent Application Publication No. 2007/0235638 published Oct. 11, 2007. Of course, the rain sensor 32 may have a different construction if desired.

Although the module 30 may be mounted on any desired portion of a vehicle, it is contemplated that the module may advantageously be mounted on the front window, that is, the windshield 38 (FIG. 3), of a vehicle with a mounting bracket 40. A layer of an adhesive 42 is provided to fixedly secure the mounting bracket 40 to an inner side surface 46 of the windshield 38. The mounting bracket 40 and layer 42 of adhesive have aligned openings through which the rain sensor coupling device 34 extends into engagement with the inner side surface 46 of the windshield 38.

The bracket 40 has a plurality of projections 47 which position a side surface area on the bracket 40 at a uniform distance from the inner side surface 46 of the windshield 38. This results in the layer 42 of adhesive having a uniform thickness. When the vehicle is traveling forward, the direction of movement of the vehicle is indicated schematically by an arrow 48.

Although the module 30 has been shown in FIG. 3 as being connected with the windshield 38 of a vehicle, it is contemplated that the module 30 may be mounted on a different window of a vehicle. Alternatively, the module 30 may be mounted on a portion of the vehicle other than a window. For example, the module 30 may be mounted on the roof or instrument panel of the vehicle if desired.

The module 30 has a front or forward facing major side 54 (FIG. 2) and a rear or backward facing major side 56 (FIG. 1). The front and rear major sides 54 and 56 are interconnected by a plurality of minor sides 60, 62, 64 and 66. In the embodiment of the module illustrated in FIGS. 1 and 2, the module has a generally rectangular configuration. Therefore, the minor sides 60-66 are arranged in a rectangular array which extends between the major sides 54 and 56.

It is contemplated that the module 30 may be provided with a different configuration if desired. For example, the module 30 may have a triangular configuration and have only three minor sides which interconnect major sides. Alternatively, the module 30 may have a cylindrical configuration and have only one minor side, that is, a cylindrical minor side, which interconnects a pair of circular major sides.

In the embodiment of the invention illustrated in FIGS. 1-3, a camera assembly 72 (FIG. 3) is also provided in the module. The camera assembly 72 has a field of view which extends through an opening 74 formed in the minor side 62 of the module 30. The camera assembly 72 has a central axis which is skewed forwardly and downwardly at an acute angle relative to the inner side surface 46 of the windshield 38.

The scene which is imaged by the camera assembly 70 is viewed through a portion of the windshield 38 disposed below the module 30. The angle of view of the camera assembly 72 is such that the scene which is imaged by the camera assembly may include areas disposed on opposite sides of the vehicle as well as forward of the vehicle. The camera assembly 72 may be included as a portion of a lane departure warning or collision avoidance system which avoids collisions between a vehicle in which the camera assembly is mounted and vehicles on opposite sides and/or ahead of the vehicle in which the camera assembly is mounted.

In the embodiment of the module 30 illustrated in FIGS. 1-3, the devices disposed within the module also include a temperature sensor 75 (FIG. 12) which is operable to sense the temperature of the windshield 38 (FIG. 3) and a humidity sensor 76 (FIG. 12) which is operable to sense the humidity of air disposed within the vehicle adjacent to the windshield. The temperature sensor 75 includes a resiliently deflectable temperature sensor coupling device 78 (FIGS. 2 and 12) which extends from the module 30. The coupling device 78 extends through aligned openings in the mounting bracket 40 (FIG. 3) and layer 42 of adhesive into engagement with the inner side surface 46 of the windshield 38.

Side vents 82 (FIG. 2) are provided at a corner portion of the module 30 extending between the minor sides 60 and 62 of the module. In addition, a rear or bottom vent 84 (FIG. 1) is provided in the module. The vents 82 and 84 enable the humidity sensor 76 (FIG. 12) to be exposed to air disposed adjacent to the windshield 38 (FIG. 3). Of course the vents 82 and 84 (FIGS. 1 and 2) may be provided at different locations in the module 30. The location of vents, corresponding to the vents 82 and 84, will be a function of where the humidity sensor 76 is provided in the module 30.

It should be understood that a greater or lesser number of any of many different devices may be provided in the module 30 to assist a driver of the vehicle. For example, the temperature sensor 75 and humidity sensor 76 (FIG. 12) may be omitted. This would result in the module having only the camera assembly 72 and rain sensor 32. Of course, a greater number of devices may be provided to assist the driver of the vehicle. It should be understood that if only two devices are provided in the module to assist the driver of a vehicle, they may be devices other than a rain sensor 32 and/or a camera assembly 72.

Rain Sensor

In the embodiment of the invention illustrated in FIGS. 1-3, a rain sensor 32 is disposed in the module 30. The rain sensor 32 has a generally known construction which includes a lens plate 90 (FIG. 4) in which a plurality of lenses 92 are disposed. The circular lens plate 90 is received in a rigid annular retainer 94. The retainer 94 may be molded as one piece around the lens plate 90 or be formed separately from the lens plate. The retainer 94 is circumscribed by an annular seal 98 formed of a flexible polymeric material. The seal 98 may be molded as one piece around the retainer 94 or be formed separately from the retainer.

Figure 4:
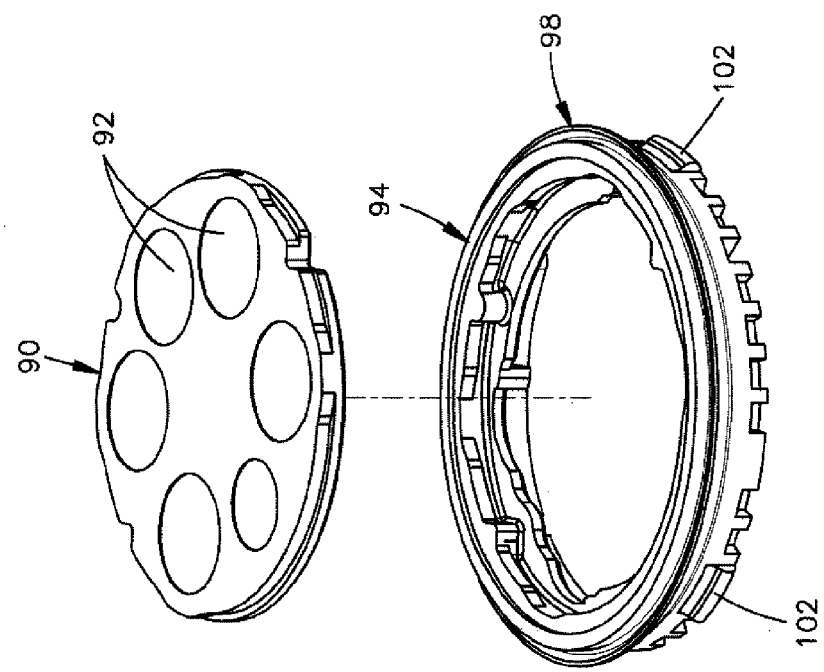
FIG. 4 is a partially exploded schematic illustration depicting the relationship of a lens plate of a rain sensor to a retainer and seal.

The one piece seal 98 extends around the retainer 94 and has a plurality of outwardly projecting mounting tabs 102. Although only a pair of mounting tabs 102 are illustrated in FIG. 4, it should be understood that there are three mounting tabs 102 disposed at equally spaced intervals about the periphery of the annular seal 98. Of course, a greater or lesser number of mounting tabs 102 may be provided. Although the rain sensor 32 and lens plate 90 may have many different constructions, the illustrated rain sensor and lens plate have a construction similar to the construction disclosed in U.S. Patent Application Publication No. 2007/0235638 published Oct. 11, 2007.

The resiliently flexible coupling device 34 (FIG. 5) is positioned over the lens plate 90 in a coaxial relationship with the circular retainer 94. The circular coupling device 34 may be formed by dispensing silicone onto the lens plate 90 and curing the silicone. An annular upper lip on the retainer 94 extends around a portion of the periphery of the coupling device 34 to center the coupling device relative to the lens plate 90. The coupling device 34 extends axially outward (upward as viewed in FIGS. 5 and 6) from the upper lip of the retainer 94.

Figure 5:
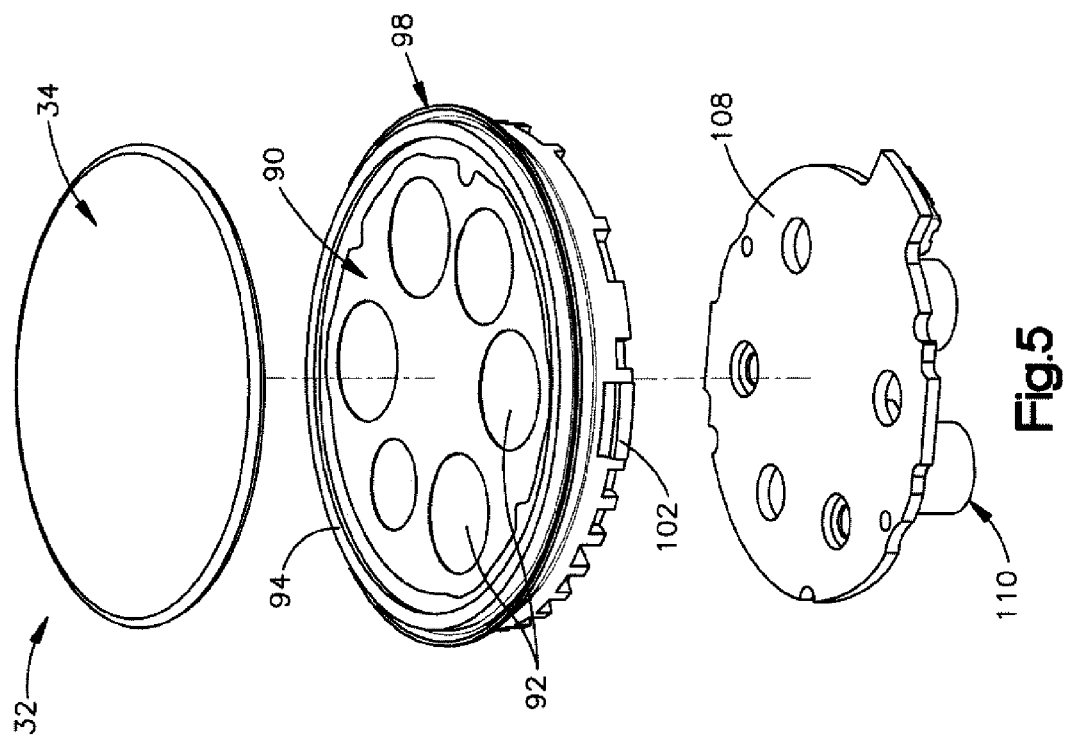
FIG. 5 is a partially exploded schematic illustration depicting the relationship of a coupling device and control circuitry to the lens plate and retainer of FIG. 4.
Figure 6:
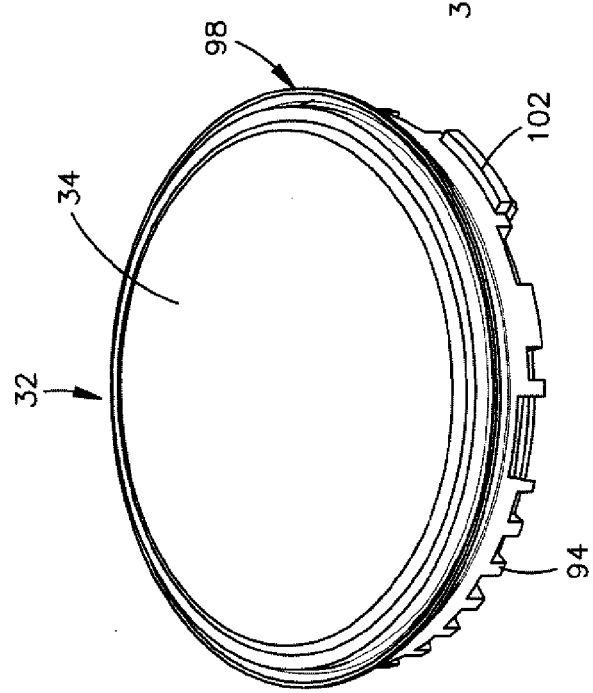
FIG. 6 is a schematic pictorial illustration depicting the manner in which the components of FIGS. 4 and 5 are interconnected to form a rain sensor.

The resiliently compressible coupling device 34 is formed by a transparent polymeric material having flat parallel circular major side surfaces which are held in a coaxial relationship with the lens 90 by the retainer 94 in the manner illustrated in FIG. 6. The coupling device 34 does not have any significant refraction characteristics in the frequency range of light emitted from transmitters in the rain sensor 32. The transmitters and associated receivers are disposed on a printed circuit board 108 of control circuitry 110 (FIG. 5) in the rain sensor 32. The transmitters and receivers in the control circuitry 110 of the rain sensor 32 cooperate with each other and with the lens plate 90 and coupling device 34 in the same manner as is disclosed in the aforementioned U.S. Patent Application Publication No. 2007/0235638.

When the lens plate 90 has been positioned on the retainer 94, in the manner illustrated in FIG. 5 and the coupling device 34 positioned over the lens plate, control circuitry 110 and other components of the rain sensor 32 are ready for positioning relative to a base portion 120 (FIG. 7) of the module 30. The control circuitry 110 can be mounted in the base portion 120 separately from the rest of the rain sensor 32 or may be simultaneously mounted in the base portion 120 with the other components of the rain sensor. The rain sensor 32 is mounted in an outwardly opening circular recess 124 formed in the front major side 54 of the base portion 120 of the module 30.

In the illustrated embodiment, the base portion 120 is formed of metal. In this embodiment, the base portion 120 is formed of magnesium. However, if desired, the base portion 120 may be formed of a different metal. Alternatively, the base portion 120 may be formed of a material other than metal. For example, if desired, the base portion 120 may be formed of a polymeric material.

Figure 7:
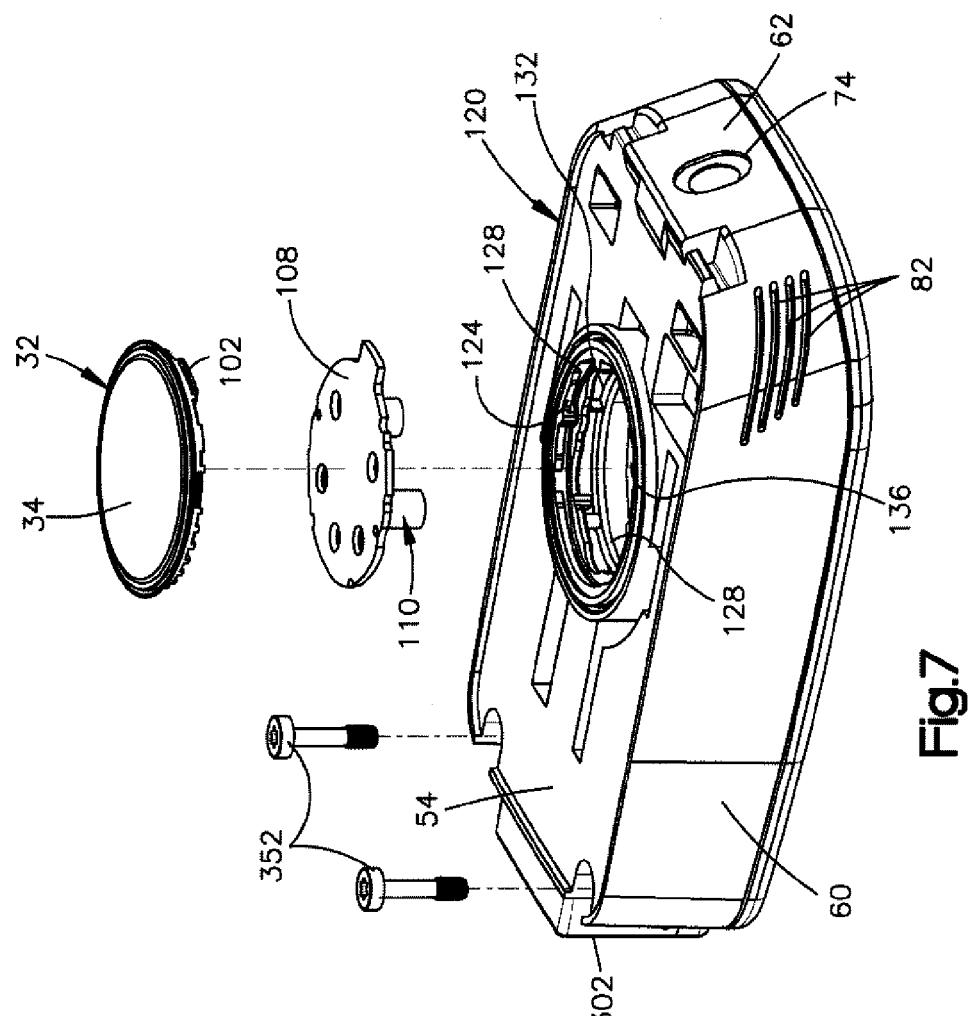
FIG. 7 is a partially exploded schematic illustration depicting the manner in which the rain sensor of FIG. 6 is positioned relative to a base portion of the module of FIGS. 1-3.

Assuming that the control circuitry 110 is to be mounted in the recess 124 before the other components of the rain sensor 32, in the manner illustrated schematically in FIG. 7, the circular printed circuit board 108 is pressed into retainers which extend from the sidewall of the recess 124. The retainer 94 is then moved downward (as viewed in FIG. 7) into the recess 124 along with other components of the rain sensor 32. The retainer 94 is pressed firmly against the printed circuit board 108 to locate the printed circuit board relative to the base portion 120 of the module 30.

The printed circuit board 108 may include a plurality of openings 126 adjacent an outer periphery of the printed circuit board 108. The openings 126 are adjacent portions of the outer periphery of the printed circuit board that engage the base portion 120. The openings 126 isolate the strain produced in the printed circuit board 108 upon pressing the printed circuit board into the recess 124 in the base portion 120. Accordingly, the main circuitry 110 is protected from the strain to prevent damage to the main circuitry upon pressing the printed circuit board 108 in to the base portion 120.

As the retainer 94 is moved downward (as viewed in FIG. 7) into the recess 124, the seal 98 moves into sealing engagement with the annular sidewall of the recess 124. As this occurs, the mounting tabs 102 on the seal 98 snap into openings 128 formed in the sidewall of the recess. Although only two openings 128 are illustrated in FIG. 7, it should be understood that there are three openings 128 formed in the sidewall 124. The number of openings 128 formed in the sidewall 124 is equal to the number of mounting tabs 102 formed on the seal 98. Although there are three mounting tabs 102 and openings 128 in the illustrated embodiment, a greater or lesser number of mounting tabs and openings may be provided if desired.

Engagement of the mounting tabs 102 with the openings 128 (FIG. 7) is effective to resiliently press the retainer 94 firmly against the printed circuit board 108 and to press the circuit board against an annular bottom lip 132 of the recess 124. The bottom lip 132 forms a circular opening 136 through which control circuitry components mounted on the printed circuit board 108 extend into an inner chamber of the module 30. The seal 98 is effective to hold the retainer 94 and the control circuitry 110 against movement relative to the base portion 120 of the module 30. The seal 98 also sealingly engages the sidewall of the recess 124 to block the entry of moisture, dust and/or other particulate into the base portion 120 of the module 30 through the opening 136.

Camera Assembly

In addition to the rain sensor 32, the camera assembly 72 (FIG. 8) is provided in the module 30. It should be understood that devices other than the rain sensor 32 and/or camera assembly 72 may be provided in the module 30. These devices may be provided in addition to the rain sensor 32 and camera assembly 72 or may be provided in place of the rain sensor and/or camera assembly.

Figure 13:
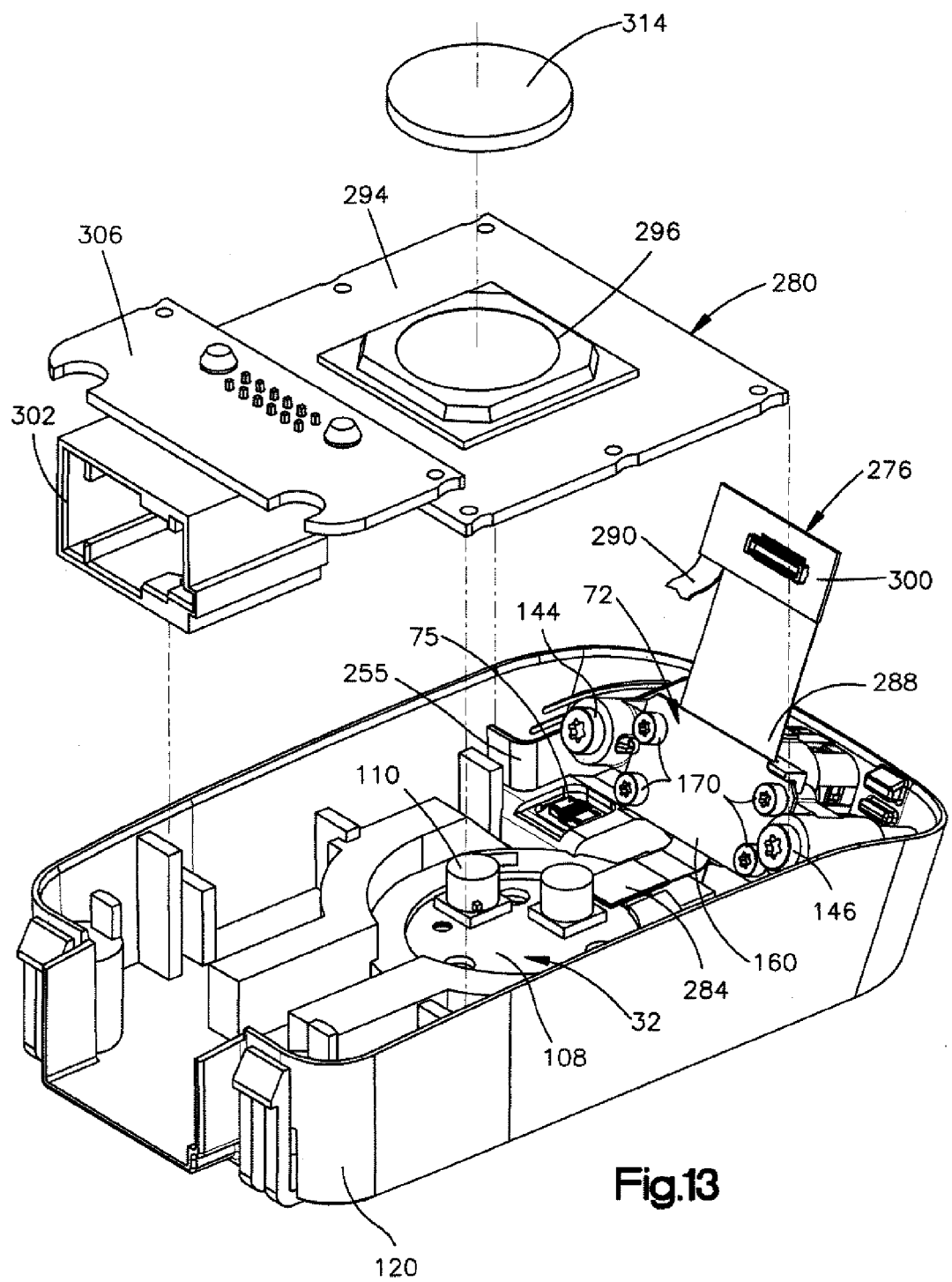
FIG. 13 is a partially exploded schematic illustration depicting the manner in which the camera assembly and rain sensor are positioned in the base portion of the module and the manner in which main control circuitry is positioned in the base portion of the module in association with a pad of heat conductive material.

The camera assembly 72 includes a mounting section 142 which is fixedly secured in the base portion 120 by fasteners 144 and 146 (FIGS. 8, 9 and 13). A camera lens 150 (FIGS. 8 and 9) is telescopically received in a cylindrical opening 152 (FIG. 8) formed in the mounting section 142. The camera lens 150 may be threadably received in the opening 152. An inner end portion of the cylindrical camera lens 150 is received in the opening 152 and is disposed adjacent to an image sensor 154 on a printed circuit board 160.

A rectangular pad 162 (FIG. 8) has a central opening 164 which extends around the image sensor 154. The central axis of the cylindrical opening 152 extends through the center of the image sensor 154. The central axis of the cylindrical opening 152 is coincident with the central axis of the camera lens 150.

The printed circuit board 160 is secured to the mounting section 142 by fasteners 170 (FIGS. 8, 9 and 13). When the camera lens 150 is disposed in the mounting section 142 and the printed circuit board 160 is secured in place, in the manner illustrated in FIG. 9, the center of the image sensor 154 (FIG. 8) is disposed on the central axis of the camera lens 150. At this time, an outer end portion 174 of the camera lens 150 extends outwardly toward the opening 74 (FIGS. 2 and 3) in the minor side 62 of the module 30. The camera lens 150 extends in a direction away from the printed circuit board 160 (FIGS. 8 and 9) on which the image sensor 154 is disposed. When the module 30 (FIG. 3) is mounted on the windshield 38, a central axis of the camera lens 150 extends generally parallel to the direction of movement 48 and forward toward the windshield.

The image sensor 154 (FIG. 8) converts an optical image, transmitted through the camera lens 150, to an electrical signal. The image sensor 154 is a complementary metal-oxide-semiconductor active pixel sensor. However, the image sensor 154 may be of the charge-coupled device type if desired.

In accordance with one of the features of the invention, a polarizer lens assembly 180 (FIG. 10) is provided in association with the camera lens 150 (FIG. 3). The polarizer lens assembly 180 includes a retainer or base 184 (FIGS. 10 and 11) having a rectangular central portion 188 (FIG. 10). An inner seal 190 is provided on the central portion 188 of the base 184. The inner seal 190 is molded as one piece of a resilient polymeric material. The inner seal 190 has a circular inwardly extending inner end portion 194 which is sealingly engagable with the outer end portion 174 of the camera lens 150 (FIGS. 8 and 9). In addition, the inner seal 190 (FIG. 10) has an outer end portion 198 which is sealingly engagable with a polarizer lens 202.

The rectangular polarizer lens 202 is received in a rectangular opening or recess formed in the central portion 188 of the base 184 (FIG. 10). When the polarizer lens 202 is disposed in the recess 206 in the base 184, the outer end portion 198 of the inner seal 190 is pressed firmly against a flat rectangular inner side surface 204 of the lens 202.

In the embodiment of the invention illustrated in FIG. 10, the inner seal 190 is integrally molded as one piece against surfaces of the central portion 188 of the base 184. It is contemplated that, the inner seal 190 may be formed separately from the base 184 and subsequently positioned in the base. However, it is believed that, from an ease of fabrication standpoint, it may be desired to mold the inner seal 190 in situ with the central portion 188 of the base 184. Regardless of how the inner seal 190 is formed, the inner end portion 194 of the inner seal seals against the outer end portion 174 of the camera lens 150. The outer end portion 198 of the inner seal 190 seals against the inner side surface 204 of the polarizer lens 202.

An outer seal 208 (FIGS. 10 and 11) is molded as one piece of a resilient polymeric material. The outer seal 208 has a central portion 210 with an annular axially outwardly extending sealing flange 212. In addition, the outer seal 208 has an axially inwardly extending sealing flange 214. Resiliently deflectable mounting sections 218 (FIG. 10) extend from the central portion 210 of the outer seal 208 and are engagable with openings 220 formed in the central portion 188 of the base 184.

The mounting sections 218 on the outer seal 208 interconnect the outer seal and the base 184. The mounting sections 218 press the inwardly extending sealing flange 214 on the outer seal 208 firmly against a flat rectangular outer side surface 224 on the polarizer lens 202. This results in the inner side surface 204 of the polarizer lens 202 being pressed firmly against the outer end portion 198 of the inner seal 190. The inner and outer seals 190 and 208 securely seal against opposite sides 204 and 224 of the polarizer lens 202.

The base 184 of the polarizer lens assembly 180 has rightwardly (as viewed in FIG. 10) extending legs or mounting sections 230. The resiliently deflectable leg sections 230 extend into correspondingly shaped recesses 236 formed in the mounting section 142 (FIG. 9). When the camera assembly 72 is mounted in the base portion 120 of the module 30, the polarizer lens assembly 180 is disposed around the outer end portion 174 of the camera lens 150 (FIGS. 3, 8 and 9). In addition, the polarizer lens assembly 180 is disposed between the mounting section 142 (FIG. 3) for the camera lens 150 and an inner side of the base portion 120 of the module 30.

When the camera assembly 72 is mounted in the module 30, the camera lens 150 and polarizer lens assembly 180 are disposed in a coaxial relationship with a circular opening 74 (FIG. 7) formed in a minor side 62 of the module 30 (FIG. 2). The outwardly extending sealing flange 212 (FIGS. 10 and 11) on the outer seal 208 is disposed in sealing engagement with an inner side surface of the minor side 62 of the module 30 (FIG. 3) The outer seal 208 extends around the periphery of the opening 74 to prevent leakage of moisture, dust and/or particulate into the module 30.

Humidity/Temperature Sensing

In the embodiment of the invention illustrated in FIGS. 1-10, the devices in the module 30 include a rain sensor 32 and camera assembly 72. It is contemplated that other devices, which are useful in assisting an operator of a vehicle, may also be mounted in the module 30. For example, a windshield temperature sensor 75 (FIG. 12) and a humidity sensor 76 may be mounted in the module 30. By comparing the output of the humidity sensor 76 and windshield temperature sensor 75, it is possible to predict when fogging or misting may occur on the inner side surface 46 (FIG. 3) of the windshield 38. This allows heating and ventilating controls for the vehicle to initiate action to prevent the formation of mist on the inner side surface 46 of the windshield 38. This action may include heating the inner side surface 46 of the windshield 38.

The humidity sensor 76 (FIG. 12) is exposed to air from the interior of the vehicle. Air from the interior of the vehicle is conducted into a generally rectangular compartment 254 in which the humidity sensor 76 is disposed. Air from inside the vehicle enters the compartment 254 through the inlet slot 84 formed in a cover portion 260 of the module 30. The air flows from the inlet slot 84 past the humidity sensor 76, in the manner illustrated schematically by arrows in FIG. 12, to outlet slots 82 (FIG. 2) formed in the base portion 120 of the module 30. This results in the humidity sensor 76 (FIG. 12) being exposed to a flow of air which is at the same temperature and humidity as the air in the vehicle. If desired, a small fan or other device may be provided to promote a flow of air from the inlet slot 84 through the outlet slots 82. It is contemplated that the cover portion 260 may not include inlet slots 84. The slots 82 would conduct air into and out of the compartment 254 if the cover portion 260 does not have an inlet slot.

The generally rectangular compartment 254 is partially formed by the minor sides 60 and 62 (FIG. 2) of the base portion 120 of the module 30. In addition, the compartment 254 is formed by an L-shaped sidewall 255 (FIGS. 12 and 13) disposed in the module 30. A portion 257 of the sidewall 255 extends downward (as viewed in FIG. 12) from the base portion 120 of the module 30. Another portion 259 of the sidewall 255 extends upward (as viewed in FIG. 12) from the cover portion 260 of the module 30.

For a given level of humidity of air in the vehicle, the tendency for mist to form on the inner side surface 46 of the windshield 38 is a function of the temperature of the windshield. The windshield temperature sensor 75 provides an output which is indicative of the temperature of the inner side surface 46 (FIG. 3) of the windshield 38. The windshield temperature sensor 75 (FIG. 12) includes a thermistor 258 which is thermally coupled to the inner side surface 46 of the windshield 38 by a resilient body 262 of thermally conductive polymeric material.

A body 266 (FIG. 12) of thermally insulating polymeric material extends around the printed circuit board 270 on which the thermistor 258 is mounted and around the body 262 of thermally conductive coupling material. The body 266 of thermally insulating polymeric material and the body 262 of thermally conductive polymeric material form the coupling device 78 which connects (couples) the windshield temperature sensor 75 with the inner side surface 46 of the windshield 38. The body 266 of thermally insulating polymeric material and the body 262 of thermally conductive material are both resiliently deflectable and can be compressed against the inner side surface 46 (FIG. 3) of the windshield 38. The mounting bracket 40 and layer 42 of adhesive are provided with aligned openings through which the bodies 266 and 262 extend into engagement with the inner side surface 46 of the windshield 38.

The humidity sensor 76 responds to changes in the humidity in the air contained in the passenger cabin of the vehicle. Similarly, the thermistor 258 responds to changes in the temperature of the inner side surface 46 of the windshield 38.

The illustrated embodiment of the cover portion 260 is formed of metal. In this embodiment, the cover portion 260 is formed of magnesium. However, if desired, the cover portion 260 may be formed of a different metal. Alternatively, the cover portion 260 may be formed of a material other than metal. For example, if desired, the cover portion 260 may be formed of a polymeric material.

In the illustrated embodiment of the invention, the base portion 120 and cover portion 260 are both formed of metal, specifically magnesium. However, the cover portion 260 may be formed of one material and the base portion 120 formed of a different material. It is believed that it may be desired to form both the cover portion 260 and base portion 120 of the metal magnesium to obtain structural integrity, electromagnetic interference containment, thermal conductivity, and low weight. However, the cover portion 260 and/or base portion 120 may be formed of a polymeric material if desired.

Electrical Interconnection

The rain sensor 32 (FIGS. 5, 6, 7 and 13) is assembled in the base portion 120 of the module 30 (FIG. 13) with control circuitry 110 disposed on the printed circuit board 108 exposed to the interior of the base portion 120 of the module. A hybrid flex connector 276 (FIGS. 13 and 14) is utilized to connect the rain sensor 32 and the camera assembly 72 (FIGS. 13 and 14) with main control circuitry 280. The hybrid flex connector 276 includes an end portion 284 (FIGS. 8 and 13) which is connected with the printed circuit board 108 (FIG. 13) in the rain sensor 32. A central portion 288 (FIGS. 8 and 13) of the hybrid flex connector 276 is connected with the printed circuit board 160 in the camera assembly 72. The image sensor for the camera assembly 72 is connected with the printed circuit board 160 and is connected with the central portion 288 of the hybrid flex connector 276.

The hybrid flex connector 276 is a flexible printed circuit board having at least two layers. The end portion 284 includes two rigid printed circuit boards on either side of the hybrid flex connector 276 for connecting the end portion 284 to the printed circuit board 108 of the rain sensor 32. The central portion 288 of the hybrid flex connector 276 extends between two rigid circuit boards of the printed circuit board 160 of the camera assembly. An end portion 300 of the hybrid flex connector 276 includes two rigid printed circuit boards on either side of the hybrid flex connector for connecting the end portion 300 of the printed circuit board 294 of the main control circuitry 280.

The humidity sensor 76 (FIG. 12) and windshield temperature sensor 75 are disposed adjacent to the camera assembly 72 and are connected with the printed circuit board 294 of the main control circuitry 280 by a flexible connector 290.

Once the humidity sensor 76, windshield temperature sensor 75, rain sensor 32 and camera assembly 72 have been positioned in the base portion 120 of the module 30, the end 284 of the hybrid flex connector 276 is connected to the printed circuit board 108 of the rain sensor 32. The main control circuitry 280 (FIG. 13) is then positioned in the base portion 120. The main control circuitry 280 includes a printed circuit board 294 on which circuit components 296 are disposed. The printed circuit board 294 of the main control circuitry 280 spans the inside of the base portion 120 of the module 30. The printed circuit board 294 of the main control circuitry 280 is parallel to and is spaced a short distance from the printed circuit board 108 of the control circuitry 110 (FIG. 13) for the rain sensor 32.

The printed circuit board 294 of the main control circuitry 280 is pressed into the base portion 120 of the module 30 It is contemplated that the printed circuit board 294 may include openings similar to the openings 126 in the printed circuit board 108 of the rain sensor 32 to isolate strain produced from pressing the printed circuit board 294 into the base portion 120 The printed circuit board 294 of the main control circuitry 280 extends transverse to the printed circuit board 160 of the camera assembly 72.

Once the printed circuit board 294 has been fixedly mounted in the base portion 120 of the module 30, a main end portion 300 (FIGS. 13 and 14) of the hybrid flex connector 276 is connected to the printed circuit board 294. This results in the single hybrid flex connector 276 being utilized to interconnect many of the devices disposed in the module 30. The flexible connector 290 is connected between a printed circuit board 304 for the temperature sensor 75 and the humidity sensor 76 and the printed circuit board 294.

An electrical socket 303 (FIGS. 3 and 13) is disposed in the module 30. The socket 303 receives a plug (not shown) to electrically connect the module 30 with other controls in the vehicle. The socket 303 is connected to the printed circuit board 294 and main control circuitry 280 by a ribbon cable 304 (FIG. 3) and a printed circuit board 306.

Mounted Module

When the module 30 is mounted on the inner side surface 46 of a windshield 38 using a mounting bracket 40 (in the manner illustrated in FIG. 14), the camera assembly 72 has a central axis which extends generally perpendicular to minor side 62 of the module 30 and extends through the center of the circular opening 74 in the minor side 62 of the module 30. The central axis of the camera assembly 72 is skewed at an acute angle relative to the inner side surface 46 of the windshield 38. At this time, the outer seal 208 (FIGS. 3 and 10) is disposed in sealing engagement with an inner side of the base portion 120 of the module (FIG. 3). The polarizer lens 202 extends across the opening and is engaged by the inner seal 190 (FIGS. 3 and 10). Therefore, the outer seal 208 and inner seal 190 cooperate with the polarizer lens 202 to seal the opening 74 in the minor side 62 of the module 30.

The camera lens 150 (FIG. 3) is disposed inwardly from the polarizer lens 202 and has a central axis which extends perpendicular to the parallel surfaces 204 and 224 of the polarizer lens. In addition, the central axis of the camera lens 150 is coincident with the central axis of the opening 74 (FIGS. 3 and 7). Therefore, the camera lens 150 (FIGS. 8 and 9) has a field of view which extends through the polarizer lens 202 and the opening 74 in the minor side 62 of the module 30.

At this time, the coupling device 34 (FIG. 3) of the rain sensor 32 is compressed against the inner side surface 46 of the windshield 38. The mounting bracket 40 has an opening 302 through which the rain sensor coupling device 34 extends. In addition, the coupling device 34 extends through an opening formed in the layer 42 of adhesive. This enables the rain sensor coupling device 34 to engage the inner side surface 46 of the windshield 38 with a predetermined pressure.

An outer side of the rain sensor lens plate 90 (FIGS. 3 and 4) is engaged by an inner side of the coupling device 34 (FIGS. 3 and 5). The inner side of the lens plate 90 engages the retainer 94 and transmits force to the retainer from the lens plate and coupling device 34. The annular seal 98 (FIGS. 4-6) extends around the retainer 94 and is disposed in sealing engagement with the base portion 120 of the module 30. At this time, the mounting tabs 102 (FIG. 4) extend into the recesses 128 (FIG. 7) formed in the base portion 120 of the module 30 to interconnect the rain sensor 32 and the base portion 120 of the module 30. The printed circuit board 108 of the rain sensor control circuitry 110 (FIGS. 3 and 13) extends parallel to the lens plate 90 and coupling device 34.

The printed circuit board 294 of the main control circuitry 280 extends parallel to the printed circuit board 108 of the rain sensor 32. The printed circuit board 294 of the main control circuitry 280 is spaced apart from the control circuitry 110 for the rain sensor 32.

To facilitate the transmission of heat from the main control circuitry 280, the cover portion 260 (FIG. 3) is formed of metal. The metal cover portion 260 has projections 310 (FIGS. 3 and 14) which extend toward the main control circuitry 280. The projections 310 engage a pad 314 (FIGS. 3 and 13) of thermally conductive material. The pad 314 extends across a backward or rear facing side of the main control circuitry 280. Since the pad 314 is formed of a thermally conductive material, the transmission of heat from the main control circuitry 280 to the projections 310 (FIG. 3) on the cover portion 260 is facilitated. This heat is radiated to the interior of the vehicle from the metallic cover portion 260.

Figure 14:
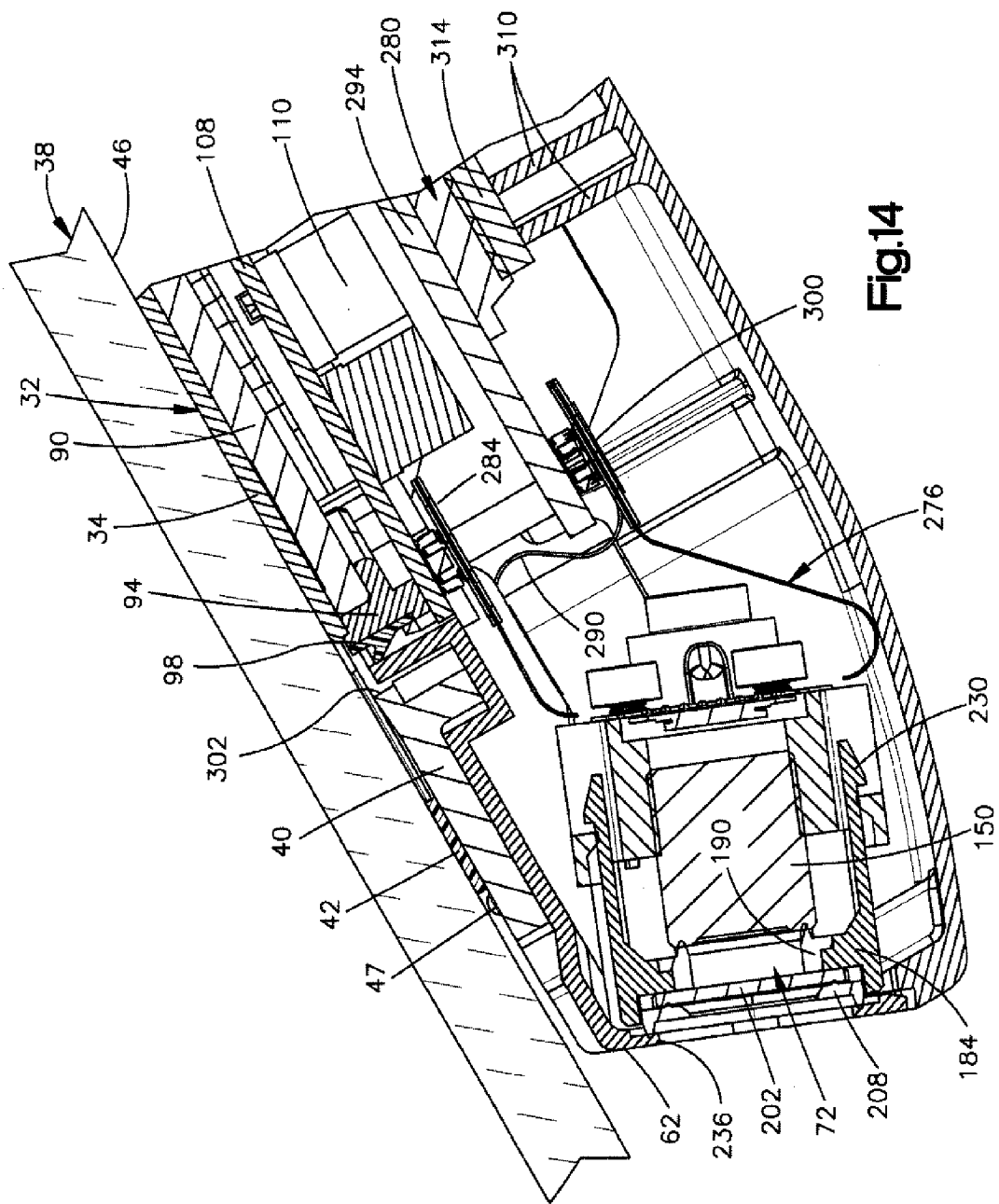
FIG. 14 is an enlarged fragmentary schematic sectional view of a portion of the module with the rain sensor, camera assembly and main control circuitry mounted in the module and with the module held in place on a windshield of a vehicle by a mounting bracket in the manner illustrated in FIG. 3.

The hybrid flex connector 276 (FIG. 3) extends along a generally U-shaped path from the end portion 284 connected to the control circuitry 110 for the rain sensor 32 through the camera assembly 72 to end portion 300 connected to the printed circuit board 294 for the main control circuitry 280. The use of the single hybrid flex connector 276 to interconnect the components of the rain sensor 32, camera assembly 72 and main control circuitry 280 facilitates assembling of the various devices in the module 30. The humidity sensor 76 and windshield temperature sensor 75 are connected to the main control circuitry by the flexible connector 290 (FIG. 14).

Interconnection of Module Components

The module 30 (FIG. 15) includes a cover portion 260 and a base portion 120. Various devices, such as the camera assembly 72, (FIG. 3) rain sensor 32, humidity sensor 76 (FIG. 12), and/or windshield temperature sensor 75 are assembled in the base portion 120 with the cover portion 260 of the module removed. Either a greater or lesser number of devices may be provided in the base portion 120.

After the various devices have been assembled in the base portion 120, the cover portion 260 (FIG. 15) is moved toward the base portion 120 at a shallow entry angle. The shallow entry angle is indicated schematically at 330 in FIG. 15. The cover portion 260 is moved forward, that is, in the direction of the arrow 332 in FIG. 15, to move a leading end portion 334 of the cover portion 260 toward a connecting end portion 336 formed at one end, that is, the left end, as viewed in FIG. 15, of the base portion 120.

Figure 15:
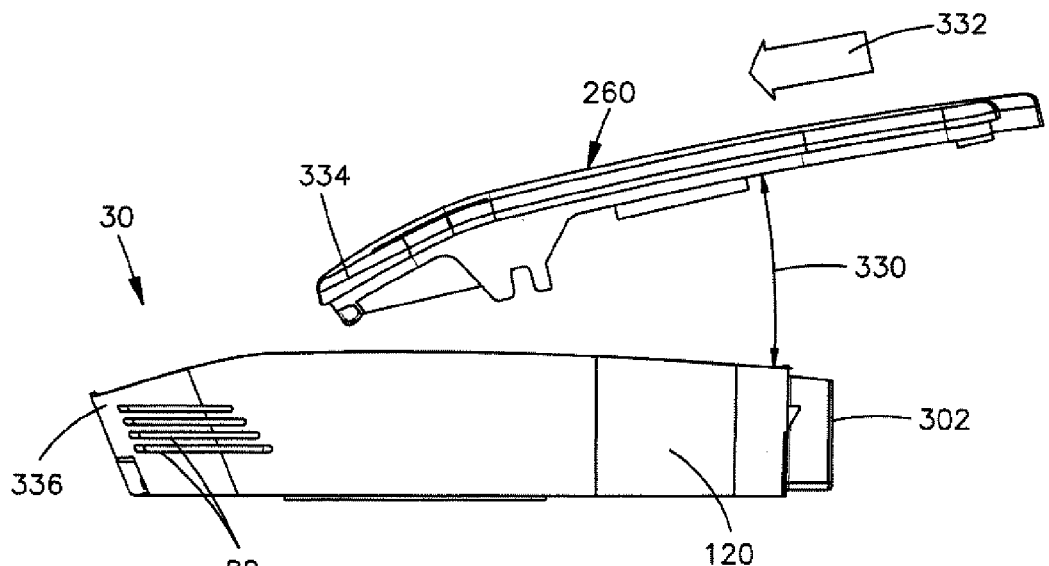
FIG. 15 is a schematic illustration depicting the manner in which a cover portion is initially positioned relative to the base portion of the module when the module is in an open condition and is to be closed.
Figure 16:
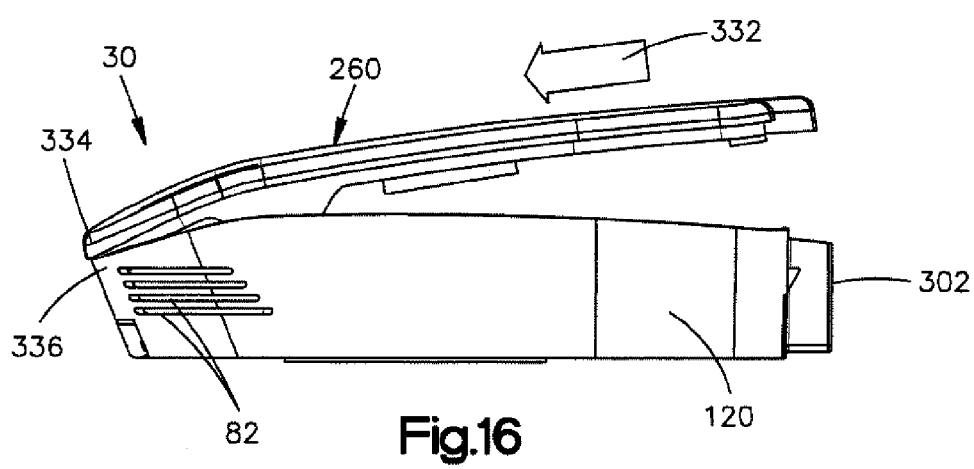
FIG. 16 is a schematic illustration, generally similar to FIG. 15, illustrating the manner in which the cover portion pivotally engages an end portion of the base portion of the module.

As the leading end portion 334 of the cover portion 260 engages the connecting end portion 336 of the base portion 120, in the manner illustrated schematically in FIG. 16, the leading end portion 334 of the cover portion 260 is pivotally connected with the base portion 120. The pivot connection between the cover portion 216 and base portion 120 is formed by engagement of a tongue 340 (FIG. 17) on the cover portion with a groove 342 on the base portion 120. Force is applied against the cover portion 260 urging the cover portion in the direction of the arrow 332 in FIGS. 15 and 16 to firmly press the tongue 340 (FIG. 17) on the cover portion 260 against the groove 342 on the base portion 120. Engagement of the tongue 340 with the groove 342 pivotally interconnects the cover portion 260 and base portion 120 of the module 30 and blocks further movement of the cover portion 260 relative to the base portion 120 in the direction of the arrow 332 of FIGS. 15 and 16. The pivot connection between the cover portion 260 and base portion 120 may have construction other than the illustrated tongue 340 and groove 342 construction.

When the cover portion 260 is in the disconnected position of FIG. 15, the cover portion is freely movable, in the direction of the arrow 332, relative to the base portion 120. When the cover portion 260 has been moved to the connected position illustrated schematically in FIG. 16, the cover portion 260 is blocked against further movement in the direction of the arrow 332 by engagement of the leading end portion 334 of the cover portion 260 with the connecting end portion 336 of the base portion 120.

As the cover portion moves in the direction of the arrow 332 of FIG. 15 from the disconnected position to the connected position of FIG. 16, a wedge 346 (FIG. 18) on the cover portion 260 moves past a lock feature 348 on the base portion 120. Thus, as the cover portion 260 is moved in the direction of the arrow 332 at the shallow entry angle 330 (FIG. 15) relative to the base portion 120, the wedge 346 on the cover portion 260 moves across an upper (as viewed in FIG. 18) end portion of the lock feature 348 without engaging the lock feature.

Figure 17:
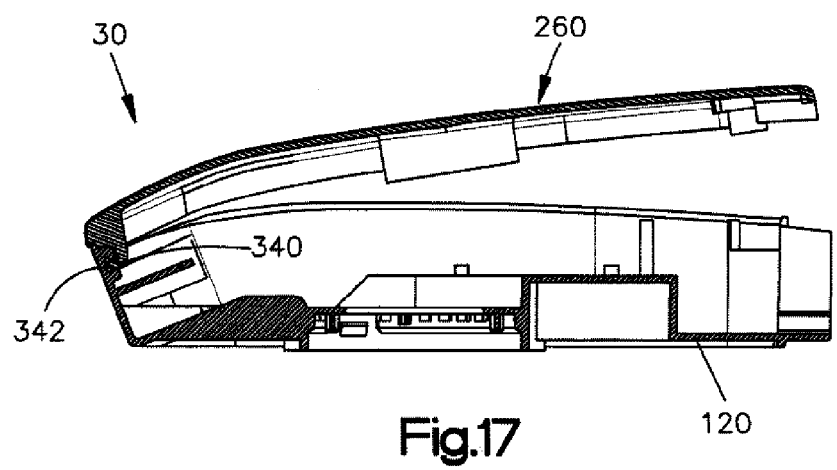
FIG. 17 is a schematic sectional view depicting a pivot connection between an end portion of the cover portion and an end portion of the base portion of the module.
Figure 22:
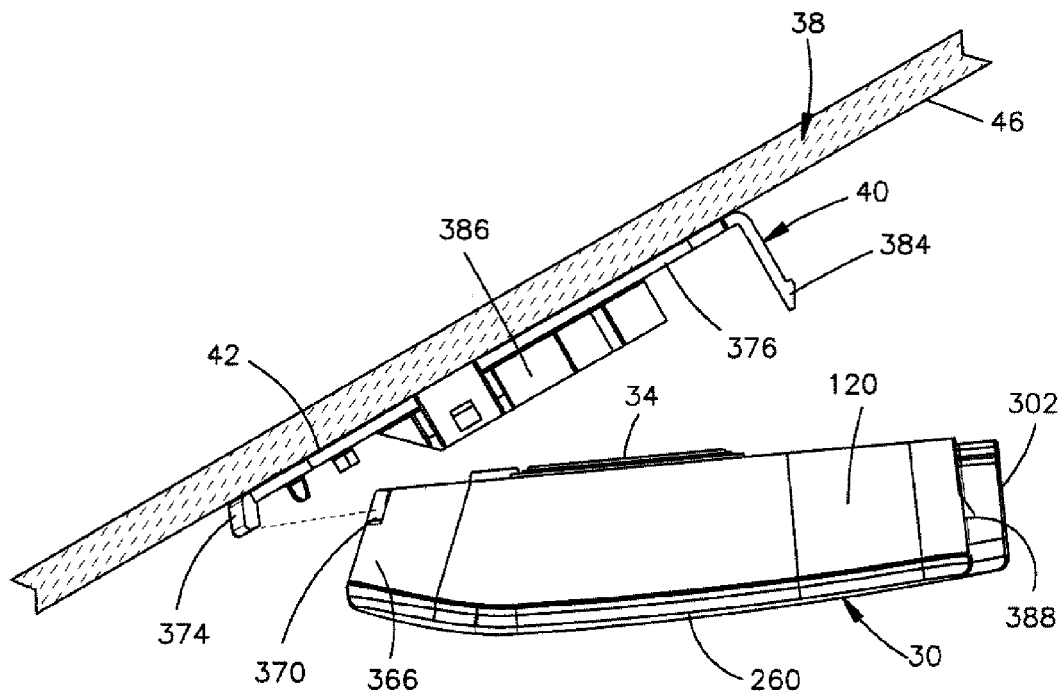
FIG. 22 is a schematic illustration depicting the manner in which the closed module is moved into engagement with a mounting bracket after the bracket has been mounted on a windshield of a vehicle.
Figure 23:
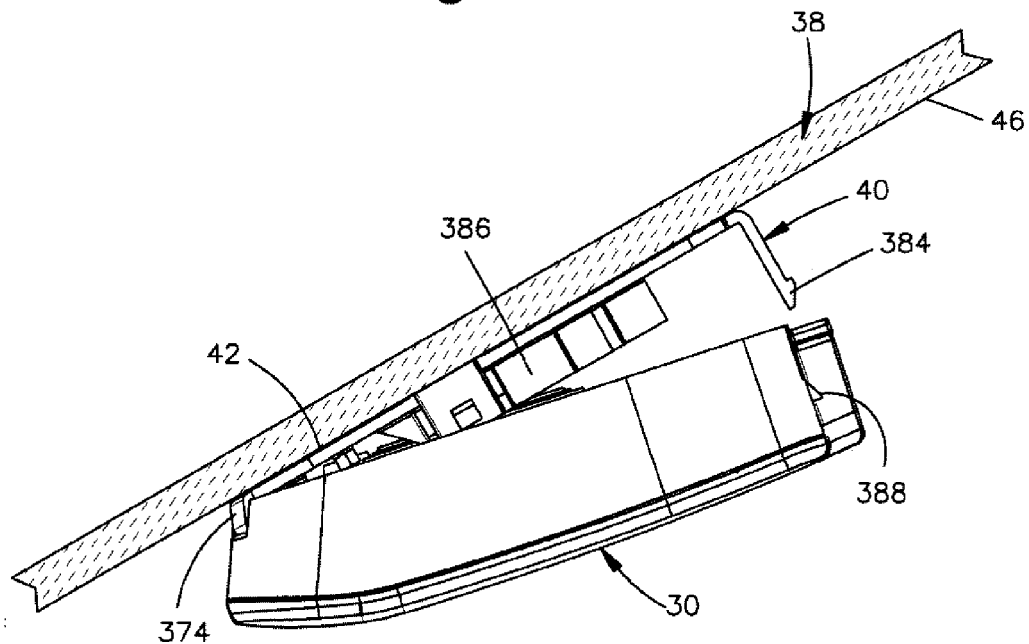
FIG. 23 is a schematic illustration, generally similar to FIG. 22, illustrating the manner in which the module is pivoted relative to the bracket.

Once the cover portion 260 has been moved to the connected condition illustrated in FIGS. 16-18, the cover portion 260 is pivoted in a clockwise direction, as viewed in FIGS. 15-18, relative to the base portion 120. This results in the angle between the cover portion 260 and base portion 120 being reduced. The pivotal movement of the cover portion 260 relative to the base portion 120 results in the cover portion moving to the partially closed position illustrated in FIG. 19. This pivotal movement of the cover portion 260 relative to the base portion 120 is accommodated by pivotal movement of the tongue 340 (FIG. 20) relative to the groove 342.

As the cover portion 260 is pivoted relative to the base portion 120, a cam surface 345 (FIG. 21) on the wedge 346 on the cover portion 260 moves into engagement with a cam surface 347 on the lock feature 348 on the base portion 120. The interaction between the cam surfaces 345 on the wedge 346 and the lock feature 348 results in a leftward (as viewed in FIGS. 20 and 21) force being transmitted from the lock feature 348 to the wedge 346. This leftward (as viewed in FIG. 20) force presses the tongue 340 on the cover portion against the groove 342 on the base portion 120.

Continued pivotal movement of the cover portion 260 from the partially closed condition of FIGS. 19-21 to a fully closed position (FIGS. 1 and 2) results in a camming action between the wedge 346 and lock feature 348. This camming action maintains a constant force on the wedge 346 pressing the tongue 340 against the groove 342 in the base portion 120. Suitable fasteners, indicated schematically at 352 in FIGS. 7 and 21, are provided to interconnect the trailing end portion of the base portion 120 and the cover portion 260.

When the fasteners 352 have been screwed into place, the cover portion 260 is locked into a fully closed position securely engaging the base portion 120, in the manner illustrated in FIGS. 1 and 2. The wedge 346 and lock feature 348 cooperate to maintain a continuous force pressing the tongue 340 against the groove 342. If desired, the fasteners 352 may be replaced with features which snap together when the cover 260 is closed against the base portion 120.

Mounting of Module

Although the module 30 may be mounted on any desired portion of a vehicle, in the embodiment of the invention illustrated in FIGS. 1-24, the module 30 is mounted on the front window, that is, the windshield 38 of a vehicle. However, it should be understood that the module 30 may be mounted on other windows of the vehicle or may be mounted on an interior portion of the vehicle, such as the roof or instrument panel.

To mount the module 30 on the windshield 38, a mounting bracket 40 (FIG. 22) is fixedly connected with an inner side surface 46 of the windshield 38 by the layer 42 of adhesive. Suitable openings are formed in the layer 42 of adhesive and in the mounting bracket 40 to enable coupling devices, such as the rain sensor coupling device 34 (FIG. 2) and the temperature sensor coupling device 78, to directly engage the inner side surface 46 of the windshield 38 when the module 30 is mounted in the bracket 40.

When the module 30 is to be mounted in the bracket 40, a leading end portion 366 (FIG. 22) of the module 30 is moved into engagement with an end portion 368 of the bracket 40. As this occurs, a recess 370 (FIG. 22) in the base portion 120 of the module 30 is moved into engagement with a retainer tab or projection 374 from a base portion 376 of the mounting bracket 40. When the recess 370 in the end portion of the base portion 120 of the module 30 has engaged the retaining tab 374 in the manner illustrated schematically in FIG. 23, the module 30 is pivoted in a counterclockwise direction (as viewed in FIGS. 22 and 23), toward the mounting bracket 40.

As the module 30 is pivoted, the rain sensor coupling device 34 moves through an opening in the bracket 40 and into engagement with the inner side surface 46 of the windshield 38. At the same time, a second mounting tab 384 (FIG. 23) engages an end portion of the module opposite from the mounting tab 374 and the recess 370 in the module. The mounting bracket 40 has projections 386 (FIGS. 22 and 23) which engage corresponding recesses in the module 30 to securely hold the module against movement relative to the mounting bracket. The mounting bracket 40 includes wedges 390 that extend into recesses 392 in the module 30. The recesses 392 include cam surfaces (not shown) that engage the wedges 390 to press the leading end portion 366 of the module 30 toward the retainer tab 374 on the mounting bracket 40. The wedges 390 interact with the cam surfaces on the recesses 392 in a manner similar to the interaction of the wedge 346 on the cover portion 260 and the lock feature 348 of the base portion 120.

Engagement of the mounting tab 384 with a retainer 388 (FIG. 23) on the module 30 holds the module in place in the bracket 40 (FIG. 24). At this time, the rain sensor coupling device 34 is pressed against the inner side surface 46 of the windshield 38 with a predetermined force. This force is sufficient force to establish an optical coupling between a rain sensor 32 in the module 30 and the windshield 38. Similarly, the temperature sensor coupling device 78 (FIG. 2) is also pressed through an opening in the bracket 40 into engagement with the inner side surface 46 of the windshield 38 with a predetermined force. This force is sufficient force to establish a thermal coupling between the windshield temperature sensor 75 and the windshield 38.

It should be understood that additional coupling devices may be utilized to provide a coupling between the windshield 38 and the module 30. While this is done, additional openings will be provided in mounting bracket 40. The additional coupling devices will also be pressed firmly against the inner side surface 46 of the windshield with a predetermined force sufficient force to establish a desired coupling between the inner side surface 46 of the windshield 38 and the module 30.

When the module 30 is mounted on the windshield 38 in the manner illustrated schematically in FIGS. 3 and 24, the camera assembly 72 (FIG. 3) faces toward the inner side surface 46 of the windshield 38. By positioning the mounting bracket 40 and module 30 relatively high on the windshield, for example, at a location adjacent to and slightly forward of a rearview mirror in the vehicle, the camera assembly 72 is provided with a relatively high field of view of the area ahead and alongside of a vehicle in which the camera assembly is mounted.

Alternative Embodiment

In the embodiment of the invention illustrated in FIGS. 1-24, the camera assembly 72 (FIG. 3) is disposed at a lower end portion of the module 30 when the module is mounted on the windshield 38. Thus, the camera assembly 72 is disposed in the portion of the module 30 which is closest to the instrument panel of the vehicle when the module is mounted on the windshield in the manner illustrated in FIG. 3. In the embodiment illustrated in FIG. 3, the camera assembly 72 has a view through an opening 74 formed in a minor side 62 of the module 30.

In the embodiment of the invention illustrated in FIGS. 25 and 26, the camera assembly 72 is mounted at an end portion of the module which is furthest from the instrument panel when the module is mounted on the windshield. The camera assembly has a field of view through an opening formed in the forward facing major side of the module. Since the embodiment of the invention illustrated in FIGS. 25 and 26 is generally similar to the embodiment of the invention illustrated in FIGS. 1-24, similar numerals will be utilized to describe similar components, the suffix letter "a" being associated with the embodiment of the invention illustrated in FIGS. 25 and 26 to avoid confusion.

A module 30*a* (FIGS. 25 and 26) has the same general construction as the module 30 of FIGS. 1-24. The module 30*a* includes a cover portion 260*a* and a base portion 120*a*. The module 30*a* has a forward facing major side 54*a* on the base portion 120*a* and a rearward facing major side 56*a* on the cover portion 260*a*. Minor sides 60*a*, 62*a*, 64*a* and 66*a* are disposed in a generally rectangular array and extend between the major sides 54*a* and 56*a* of the module 30*a*. A coupling device 34*a* of a rain sensor assembly 32*a* extends from the forward facing major side 54*a* of the module 30*a*.

In accordance with a feature of the embodiment of the invention illustrated in FIGS. 25 and 26, a camera assembly 72a has a field of view which opens outwardly from the forward facing major side 54a of the module 30a. A recess or channel 410 is formed in the forward facing major side 54a of the module 30a. Therefore, the field of view of the camera assembly extends forwardly through the generally wedge shaped recess or channel 410 and through a windshield, corresponding to the windshield 38 of FIG. 3, of the vehicle in which the module 30a is disposed.

The rain sensor 32a is disposed downward, that is, closer to the instrument panel, from the camera assembly 72a when the module 30a is mounted on the windshield of a vehicle, in the manner illustrated schematically in FIGS. 3 and 24 for the module 30. This results in the rain sensor assembly 32a being disposed between a lower end of a downwardly and forwardly sloping flat side surface 414 of the recess or channel 410 and a lower minor side 62a of the module 30a.

The side surface 414 of the recess or channel 410 intersects the major side 54a of the module 30a at a linear line 416 of intersection. The line 416 extends perpendicular to the minor sides 60a and 66a of the module 30a. Although the line 416 is spaced from the rain sensor 32a, the line is closer to the rain sensor 32a than the line is to the camera assembly 72a.

The field of view of the camera assembly 72a, when the module 30a is mounted on the windshield of a vehicle, extends forward to the windshield 38 of the vehicle at a location above the location where the rain sensor coupling device 34a engages the windshield of the vehicle. The camera assembly 72a has a central axis and a field of view with a central axis which is coincident with a central axis of the generally wedge shaped recess or channel 410. The central axis of the camera assembly 72a extends perpendicular to and is spaced from the line 416 of intersection of the side surface 414 of the recess or channel 410 with the major side 54a of the module 30a.

The central axis of the camera assembly 72a and the central axis of the recess or channel 410 intersect the central axis of the rain sensor 32a downwardly and forwardly of the recess or channel 410 when the module 30a is mounted on the windshield of a vehicle. In the embodiment illustrated in FIGS. 25 and 26 the central axis of the camera assembly 72a is coincident with the central axis of the recess or channel 410. However, the central axis of the camera assembly 72a may be offset from the central axis of the recess or channel 410.

The recess or channel 410 tapers toward the camera assembly 72a from the straight line 416 of intersection between the side surface 414 of the recess or channel and the major side 54a of the module 30a. The line 416 of intersection of the flat side surface 414 of the recess or channel 410 with the major side 54a of the module extends perpendicular to and is offset from the central axis of the recess or channel. The recess or channel 410 has a triangular cross-sectional configuration as viewed in a plane extending parallel to the central axis of the recess or channel and perpendicular to the flat side surface 414 of the recess or channel. The coupling device 34a has a circular configuration as viewed in a plane which extends parallel to the major side 54a of the module 30a and perpendicular to the central axis of the coupling device.

A mounting bracket 40a (FIG. 26), corresponding to the mounting bracket 40 of FIGS. 21-24, for the module 30a, has an opening 302a through which the camera assembly 72a is optically exposed to the windshield. In addition, the opening 302a (FIG. 26) in the mounting bracket 40a for the module 30a is large enough to accept the coupling device 34a for the rain sensor 32a. The opening 302a in the mounting bracket 40a has a size and configuration corresponding to the size and configuration of a flange or rim 418 (FIG. 25) which extends around the recess or channel 410 for the camera assembly 72a and around the coupling device 34a for the rain sensor 32a.

The field of view of the camera assembly 72a has been indicated schematically at 424 in FIG. 26. The field of view 424 of the camera assembly 72a extends across the coupling device 34a of the rain sensor 32a. The field of view 424 of the camera assembly 72a has a central axis 428 which intersects a central axis 430 of the rain sensor 32a at an acute angle. The central axis 430 of the rain sensor 32a extends perpendicular to the upper (as viewed in FIG. 26) side surface of the coupling device 34a. The central axis of the camera assembly 72a is coincident with the central axis 428 of the field of view 424.

A cylindrical spatial envelope 434 has a central axis which is coincident with the central axis 430 of the rain sensor 32a. The cylindrical spatial envelope 434 has a diameter which is equal to an outside diameter of the rain sensor coupling device 34a. A portion of the cylindrical spatial envelope 434 is disposed in the field of view 424 of the camera assembly 72a. The field of view 424 of the camera assembly 70a expands as it extends outwardly from the camera assembly. At the location where the field of view 424 of the camera assembly 70a extends across the coupling device 34a, the field of view 424 of the camera assembly 70a is wider than the coupling device. Therefore, the field of view 424 of the camera assembly 72a extends completely around a portion of the cylindrical spatial envelope 434.

In the embodiment of the invention illustrated in FIGS. 25 and 26 the module 30a contains only the rain sensor 32a and camera assembly 72a. Both of these devices are exposed to the windshield of a vehicle through the single opening 302 (FIG. 26) formed in the mounting bracket 40a. If desired, the mounting bracket 40a could be provided with one opening for the camera assembly 72a and another opening for the rain sensor 32a. However, by forming the mounting bracket 40a with only the opening 302a for both the camera assembly 72a and the rain sensor 32a, fabrication of the mounting bracket is facilitated. In addition, positioning of the module 30a relative to the mounting bracket 40a is facilitated.

Figure 12:
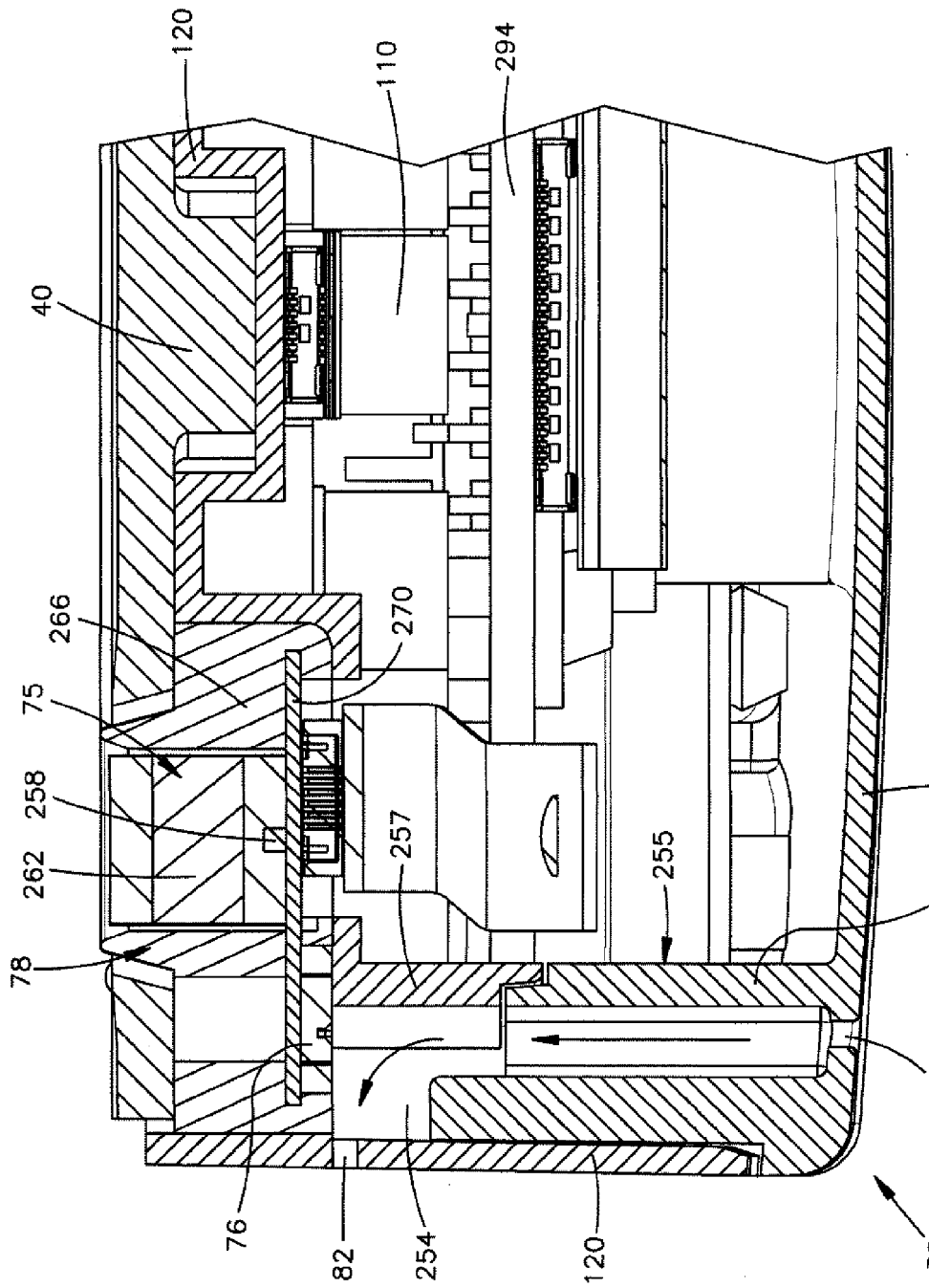
FIG. 12 is a fragmentary schematic sectional view depicting the relationship between a windshield temperature sensor and a humidity sensor disposed in the module of FIGS. 1-3.

If a windshield temperature sensor and/or humidity sensor, corresponding to the temperature sensor 75 and humidity sensor 76 of FIG. 12, is provided in the module 30a, a separate opening may be provided in the mounting bracket 40a to enable a temperature sensor coupling device to engage the vehicle windshield. Alternatively, the opening 302a in the bracket 30a (FIG. 26) may be sized to accept the recess or channel 410 for the camera assembly 72a, the coupling device 34a for the rain sensor 32a, and a coupling device for the windshield temperature sensor.

CONCLUSION

In view of the foregoing description, it is apparent that the present invention provides a new and improved apparatus for use in association with a vehicle having a windshield, that is, a front window 38. The apparatus includes a bracket 40 which is adapted to be connected with the windshield 38 or other portion of a vehicle. A module 30, that is, a unit, which is adapted to be connected with the bracket 40 may contain one or more devices to assist the driver of the vehicle. The module 30 has an end portion which pivotally engages an end portion 370 of the bracket 40 to position the module for pivotal movement relative to the bracket from a disengaged condition (FIG. 23) to an engaged condition (FIG. 24). When the module 30 is in the engaged condition, the module is urged toward the windshield 38 with a predetermined force.

The module 30 may contain many different devices. For example, the module 30 may contain a camera assembly 72. The camera assembly 72 may include an image sensor and a camera lens 150. A polarizer lens 202 may advantageously be provided in association with the camera lens 150.

Having described the invention, the following is claimed:

1. An apparatus for use in association with a vehicle having a windshield, said apparatus comprising a module, a camera assembly disposed in said module, said camera assembly includes an image sensor and a camera lens, said camera lens having a first end portion disposed adjacent to said image sensor and a second end portion spaced from said image sensor, and a polarizer lens disposed adjacent to said second end portion of said camera lens, wherein said module includes a base section and a cover section, said cover section having a first end portion which pivotally engages a first end portion of said base section, said cover section being pivotal relative to said base section between an open condition in which a second end portion of said cover section is spaced from a second end portion of said base section and a closed condition in which said second end portion of said cover section engages said second end portion of said base section, a first cam surface connected with said base section, and a second cam surface connected with said cover section, said second cam surface being slidable along said first cam surface to urge said first end portion of said cover section toward said first end portion of said base section during movement of said cover section from the open condition to the closed condition.

2. An apparatus as set forth in claim 1 wherein said module has a first major side which faces toward the windshield, a second major side which faces away from the windshield, and a minor side which extends between said first and second major sides, said minor side of said module having an opening through which said camera lens is optically exposed to environment adjacent to said module.

3. An apparatus for use in association with a vehicle having a windshield, said apparatus comprising:
   a module,
   a camera assembly disposed in said module, said camera assembly includes an image sensor and a camera lens, said camera lens having a first end portion disposed adjacent to said image sensor and a second end portion spaced from said image sensor,
   a polarizer lens disposed adjacent to said second end portion of said camera lens, and
   a polarizer lens retainer, an inner seal disposed on said polarizer lens retainer, said inner seal having an inner end portion which provides a seal between said camera lens and said inner seal, said inner seal having an outer end portion which provides a seal between said polarizer lens and said inner seal, and an outer seal disposed on said polarized lens retainer, said outer seal having an inner end portion which provides a seal between said polarizer lens and said outer seal, said outer seal having an outer end portion which provides a seal between said module and said outer seal.

4. An apparatus as set forth in claim 3 wherein said outer seal has a plurality of projections which engage openings formed in said polarizer lens retainer to connect said outer seal with said polarizer lens retainer, a camera lens support disposed within and connected with said module, said first end portion of said camera lens being at least partially enclosed by said camera lens support, said polarizer lens retainer having a plurality of projections which engage openings formed in said camera lens support to connect said polarizer lens retainer with said camera lens support.

5. An apparatus as set forth in claim 2 further including a rain sensor disposed within said module, and a rain sensor coupler which projects from the first major side of said module and engages the windshield of the vehicle.

6. An apparatus as set forth in claim 5 further including a temperature sensor disposed within said module, and a temperature sensor coupler which projects from the first major side of said module and engages the windshield of the vehicle.

7. An apparatus as set forth in claim 1 further including a bracket adapted to be connected with the windshield of the vehicle, the module being adapted to be connected with said bracket to position a rain sensor disposed within said module relative to the windshield of the vehicle, said module having a first end portion which pivotally engages a first end portion of said bracket to position said module for pivotal movement relative to said bracket from a disengaged condition in which a second end portion of said module is spaced from a second end portion of said bracket and in which a rain sensor coupler connected to said module is spaced from the windshield to an engaged condition in which said second end portion of said module engages said second end portion of said bracket and in which said rain sensor coupler is pressed against the windshield with a predetermined force.

8. An apparatus as set forth in claim 5 wherein said rain sensor includes a first printed circuit board, said camera assembly includes a second printed circuit board having a major side surface extending transversely to a major side surface of said first printed circuit board, a third printed circuit board which extends parallel to said first circuit board, a single hybrid flex connector interconnects said first, second and third printed circuit boards, said single hybrid flex connector having a first end portion connected with said third printed circuit board, a central portion connected with said second printed circuit board and a second end portion connected with said first printed circuit board.

9. An apparatus as set forth in claim 1 wherein at least one printed circuit board is pressed into said module, said at least one printed circuit board having openings adjacent a portion of a periphery of said at least one printed circuit board that engages said module to isolate strain in said at least one printed circuit board produced in said at least one printed circuit board upon pressing said at least one printed circuit board into said module.

10. An apparatus as set forth in claim 1 wherein a temperature sensor is provided in said module, a temperature sensor coupler is connected with said module at a location adjacent to said temperature sensor, said temperature sensor coupler is spaced from the windshield when said module is in the disengaged condition, said temperature sensor coupler is pressed against the windshield with a predetermined force when said module is in the engaged condition.

11. An apparatus as set forth in claim 10 further including a humidity sensor disposed in said module and at least partially exposed to the interior of a chamber formed in said module, said chamber having an air inlet formed in said module to enable air to flow into and out of said chamber.

12. An apparatus as set forth in claim 5 wherein said rain sensor includes a lens plate in which a plurality of lens are disposed, a retainer which extends around at least a portion of said lens plate, and a seal which extends around at least a portion of said retainer, said lens plate, retainer, and seal being disposed in a recess formed in one major side of said module, said seal having a plurality of mounting tabs which extend into openings formed in a sidewall of said recess.

13. An apparatus as set forth in claim 1 wherein said cover section and said base section are formed of metal, said cover section having a projection which extends towards a printed circuit board in said module and is thermally coupled to circuitry on said printed circuit board by a pad formed of a thermally conductive polymeric material.

14. An apparatus for use in association with a vehicle having a windshield, said apparatus comprising:
 a module,
 a camera assembly disposed in said module, said camera assembly includes an image sensor and a camera lens, said camera lens having a first end portion disposed adjacent to said image sensor and a second end portion spaced from said image sensor,
 a polarizer lens disposed adjacent to said second end portion of said camera lens, and
 a bracket adapted to be connected with the windshield of the vehicle, the module being adapted to be connected with said bracket to position a rain sensor disposed within said module relative to the windshield of the vehicle, said module having a first end portion which pivotally engages a first end portion of said bracket to position said module for pivotal movement relative to said bracket from a disengaged condition in which a second end portion of said module is spaced from a second end portion of said bracket and in which a rain sensor coupler connected to said module is spaced from the windshield to an engaged condition in which said second end portion of said module engages said second end portion of said bracket and in which said rain sensor coupler is pressed against the windshield with a predetermined force,
 wherein said module has a first major side which faces toward said bracket when said module is in the engaged condition, a second major side which faces away from said bracket when said module is in the engaged condition, said first major side of said module includes a recess through which said camera assembly is optically exposed to environment adjacent to said module.

15. An apparatus as set forth in claim 14 wherein said camera assembly is disposed adjacent to a first minor side of said module, said rain sensor coupler being disposed between an end portion of said recess and a second minor side of said module, said second minor side of said module being disposed opposite from said first minor side of said module.

16. An apparatus as set forth in claim 15 wherein said camera assembly has a central axis which extends along said recess and intersects a central axis of said rain sensor coupler.

17. An apparatus as set forth in claim 15 wherein said bracket includes an opening through which said recess and said rain sensor coupler are exposed to an inner side of the windshield of the vehicle.

18. An apparatus as set forth in claim 3 wherein the inner seal and the outer seal are each formed from a resilient polymeric material, the inner seal abutting the camera lens and the outer seal abutting the polarizing lens.

* * * * *